US008799243B1

(12) United States Patent
Havlik

(10) Patent No.: US 8,799,243 B1
(45) Date of Patent: Aug. 5, 2014

(54) SYSTEM AND METHOD PROVIDING FOR REGULATORY COMPLIANCE

(75) Inventor: Bari Havlik, Berkeley, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 1172 days.

(21) Appl. No.: 11/586,222

(22) Filed: Oct. 25, 2006

Related U.S. Application Data

(60) Provisional application No. 60/847,405, filed on Sep. 27, 2006.

(51) Int. Cl.
G06F 7/00 (2006.01)
G06F 17/00 (2006.01)

(52) U.S. Cl.
USPC ............................................ 707/694; 705/59

(58) Field of Classification Search
None
See application file for complete search history.

(56) References Cited

U.S. PATENT DOCUMENTS

| | | | |
|---|---|---|---|
| 5,075,857 A | 12/1991 | Maresca | 364/421 |
| 5,726,884 A | 3/1998 | Sturgeon et al. | 395/209 |
| 6,122,635 A | 9/2000 | Burakoff et al. | 707/102 |
| 6,157,808 A * | 12/2000 | Hollingsworth | 434/350 |
| 6,170,742 B1 | 1/2001 | Yacoob | 235/375 |
| 6,317,751 B1 | 11/2001 | Yeger et al. | 707/104 |
| 6,654,788 B1 | 11/2003 | Chance et al. | 709/206 |
| 6,820,069 B1 | 11/2004 | Kogan et al. | 706/46 |
| 6,904,412 B1 | 6/2005 | Broadbent et al. | 705/38 |
| 6,912,502 B1 | 6/2005 | Buddle et al. | 705/1 |
| 7,092,905 B2 | 8/2006 | Behrenbrinker et al. | 705/39 |
| 2001/0032094 A1* | 10/2001 | Ghosh et al. | 705/1 |
| 2002/0032576 A1* | 3/2002 | Abbott et al. | 705/1 |
| 2002/0065780 A1* | 5/2002 | Barritz et al. | 705/59 |
| 2002/0120642 A1 | 8/2002 | Fetherston | 707/500 |
| 2003/0023477 A1* | 1/2003 | Fergusson et al. | 705/11 |
| 2003/0153991 A1* | 8/2003 | Visser et al. | 700/79 |
| 2004/0039580 A1* | 2/2004 | Steger | 705/1 |
| 2004/0139053 A1* | 7/2004 | Haunschild | 707/1 |
| 2004/0177326 A1* | 9/2004 | Bibko et al. | 715/530 |
| 2005/0278187 A1* | 12/2005 | Bobbitt | 705/1 |
| 2006/0149593 A1* | 7/2006 | Wager | 705/2 |
| 2007/0011015 A1* | 1/2007 | Alkalay | 705/1 |

FOREIGN PATENT DOCUMENTS

WO WO2005/010681 A2 * 2/2005

OTHER PUBLICATIONS

Slides from presentation at Annual Excellence in BPM Conference May 22-25, 2005, Miami, Florida (Improving Compliance & Audit Controls How BPM can be used for Employee Oversight and External Reporting in Highly Regulated Industries, 19 Pages).

* cited by examiner

Primary Examiner — Augustine K Obisesan
(74) Attorney, Agent, or Firm — Kilpatrick Townsend & Stockton LLP

(57) ABSTRACT

A system and method providing which provides compliance tracking in a regulated organization. A plurality of users having different positions and roles in an organization are provided with different levels of access to the compliance system, and all regulatory compliance related licensing information is processed through a common compliance engine. The compliance engine operates to monitor the regulatory compliance licensing activities of licensed individuals within the organization. Compliance administrators are provided with a level access to the system which allows the compliance administrator to run searches and generate reports which show the state of various regulatory compliance licensing processes within the organization. Supervisors are provided with a level of access which allows the supervisor to review compliance regulatory licensing activities and tasks for employees they supervise. Customer representatives are able to review their own regulatory compliance information and tasks. The system and method further provide for monitoring the status of various regulatory compliance licensing activities, and operate to automatically generate emails prompting individuals in the organization to undertake necessary regulatory compliance licensing activities.

9 Claims, 56 Drawing Sheets

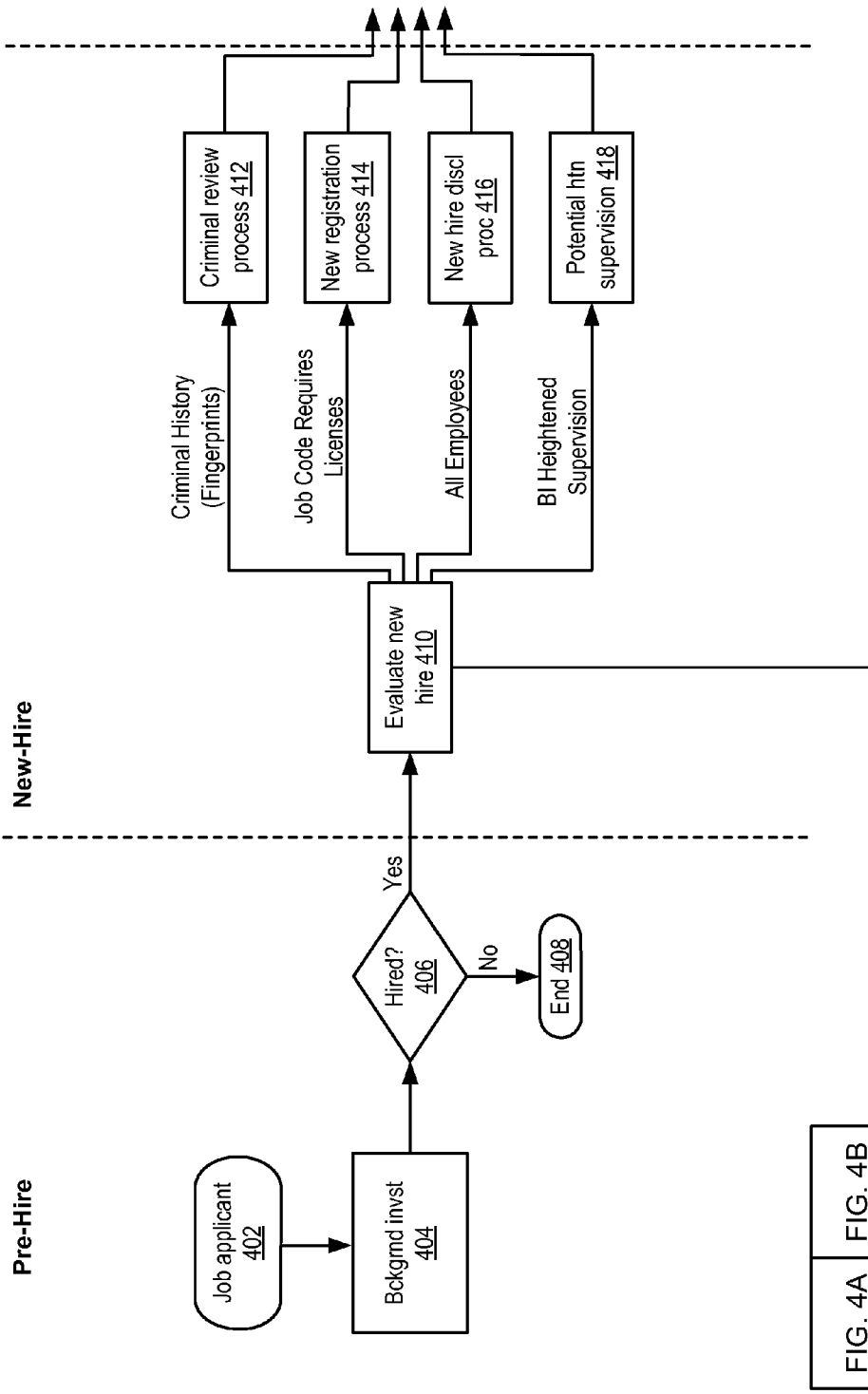

Home >> Background Investigations    Reports    Help    Close

Search | Links

Review Search

Search Option ⦿ Begins With ◯ Contains

[ Search ] [ Reset ]

Review Information

| Field | Value | Field | Value |
|---|---|---|---|
| Review Type: | Background Investigation ▼ — 505 | Final Result: | Select a value ▼ |
| Initiate By: | | Review Number: | |
| Initiated Date: | From [ ] 📅 To [ ] 📅 — 507 (mm/dd/yyyy) (mm/dd/yyyy) | Completed Date: | From [ ] 📅 To [ ] 📅 (mm/dd/yyyy) (mm/dd/yyyy) |

Individual Information

| Field | Value | Field | Value |
|---|---|---|---|
| Name: | Last [ ] First [ ] Middle [ ] | | |
| SSN: | [ ] ◯ SSN ◯ Other (or Passport – if SSN not available) | DOB: | [ ] 📅 (mm/dd/yyyy) |
| Former Employee: | ◯ Yes ◯ No | Termination Date: | [ ] 📅 (mm/dd/yyyy) |
| Hire Date: | [ ] 📅 (mm/dd/yyyy) | CRD No.: | [ ] |
| Registered: | ◯ Yes ◯ No | Aliases: | [ ] |
| E-Mail: | [ ] | | |
| Home Phone: | [ ] Work Phone: [ ] | | |
| Category: | Select a value ▼ | Multiple Assignments: | ◯ Yes ◯ No |
| Legal Entity: | Select a value ▼ | On Site?: | ◯ Yes ◯ No |
| Location: | [ ] | City: | [ ] |
| Vendor: | Select a vendor ▼ | Title: | Select a value ▼ State: Select a value ▼ |
| Position Held: | [ ] | Full Time: | ◯ Yes ◯ No |
| Manager Name: | [ ] | | |
| HR Contact: | Select a contact ▼ | | ← 506 |

1 record(s) returned — 508

| View/Edit | Review No. | Individual | SSN | Type | Status | Final Result | Date Initiated | Date Completed |
|---|---|---|---|---|---|---|---|---|
| 📄 | 106497 | | | Background Investigation | Open | | 08/03/2006 | |

OFAC / Credit / Court Records Review                                                                  [Back to Top]

OFAC Search Result: [Select a value ▼]   [Attach OFAC Record]

Credit History: [Select a value ▼]    Credit Findings: ☐ Bankruptcy  ☐ Liens/Judgements  ☐ Other Credit Score: [_____]                 Negative Debt: [_____]

Risk and Credit Review: [Select a value ▼]   Identification (SSN) verified: ○ Yes  ○ No  Attach PEER Report Credit Comments: [_____]  [◀▶]

Court Records Request: [mm/dd/yyyy] 📅   Response Received: [mm/dd/yyyy] 📅

Court Records Agency: [Select a value ▼]   Court Records Results: [Select a value ▼]  Attach Court Records

[Save]  [Reset]

---

Criminal History   [Add Now]                                                                           [Back to Top]

| View/Edit | Event Type | Event Date | Event Description | Description |
|---|---|---|---|---|

---

Employment History Verification   [Add Now]                                                            [Back to Top]

| View/Edit | Verification Status | Company / Vendor Name | Employment From | Employment To | Position(s) Held | Reason for Leaving |
|---|---|---|---|---|---|---|

---

Education Verification   [Add Now]                                                                     [Back to Top]

| View/Edit | Verification Status | Name of Instruction | City, State | Type of Diploma / Degree | Date Received | Comments |
|---|---|---|---|---|---|---|

---

Insurance Licenses and Professional Certifications   [Add Now]                                         [Back to Top]

| View/Edit | Verification Status | License / Certification | Date Obtained | License Active? | Conferred By |
|---|---|---|---|---|---|

| Application | Add Now | | | | |
|---|---|---|---|---|---|
| View/Edit | Application Date | Requisition Number | | Position Desired | Back to Top |
| | 08/03/2006 | | | Managed Account Operations | Available Date |
| | 513 | | | | |

| Criminal History | Add Now | | |
|---|---|---|---|
| View/Edit | Event Type | Event Date | Event Description | Back to Top |
| | | | | Discription |

| Employment History Verification | Add Now | | | | |
|---|---|---|---|---|---|
| View/Edit | Verification Status | Company / Vendor Name | Employment From | Employment To | Position(s) Held | Back to Top |
| | | | | | | Reason for Leaving |

| Education Verification | Add Now | | | | |
|---|---|---|---|---|---|
| View/Edit | Verification Status | Name of Instruction | City, State | Type of Diploma / Degree | Date Received | Back to Top |
| | | | | | | Comments |

| Insurance Licenses and Professional Certifications | Add Now | | | |
|---|---|---|---|---|
| View/Edit | Verification Status | License / Certification | Date Obtained | License Active? | Back to Top |
| | | | | | Conferred By |

Home >> Criminal History
Search | Links | Reports | Close

Review Search

Review Information

Search Option ● Begins With ○ Contains

Review Type: [Background Investigation ▼]    Final Result: [Select a value ▼]
Initiate By: [_____]    Review Number: [_____]
Initiated Date: From [____] 📅 To [____] 📅    Completed Date: From [____] 📅 To [____] 📅
    (mm/dd/yyyy)    (mm/dd/yyyy)    (mm/dd/yyyy)    (mm/dd/yyyy)

Individual Information

Name: [_____]   [_____]   [_____]
     Last    First    Middle
SSN: [_____] ○ SSN ○ Other    DOB: [____] 📅
    (or Passport – if SSN not available)    (mm/dd/yyyy)
Former Employee: ○ Yes ○ No
Hire Date: [____] 📅    Termination Date: [____] 📅
    (mm/dd/yyyy)    (mm/dd/yyyy)
Registered: ○ Yes ○ No    CRD No.: [_____]
E-Mail: [_____]
Home Phone: [_____]    Work Phone: [_____]    Aliases: [_____]

Category: [Select a value ▼]    Multiple Assignments: ○ Yes ○ No
Legal Entity: [Select a value ▼]    On Site?: ○ Yes ○ No
Location: [_____]    City: [_____]
Vendor: [Select a vendor ▼]    State: [Select a value ▼]
Position Held: [_____]    Title: [Select a value ▼]
Manager Name: [_____]    Full Time: ○ Yes ○ No
HR Contact: [Select a contact ▼]

[ Search ] [ Reset ]

1 record(s) returned ─ 520

| View/Edit | Review No. | Individual | SSN | Type | Status | Final Result | Date Initiated | Date Completed |
|---|---|---|---|---|---|---|---|---|
| 🔍 | 106455 | | | Criminal History Review | Open | | 08/02/2006 | |

Registration Profile

Approved Registrations
C60E(S7), NASD(S7)

Current DRP Pages
None

Approved State Registration (563, 565, 566)
AL, AR, AZ, CA, CO, FL, GA, IA, IL, ..., WV

Exam Windows

| Exam Code | Status | Status Data | Window Start Date | Window End Date | Show History |
|---|---|---|---|---|---|

Supervisory Principal Designation   Add Now

| View/Edit | Descriptiom | Start Date | End Data |
|---|---|---|---|

3070 Filing   Add Now

| View/Edit | Initiating Event | Filing Required | Filing Due Date | Date Filed |
|---|---|---|---|---|

Pre-Hire Background Investigation

| Date Completed | Final Result | | Review Number |
|---|---|---|---|
| 11/09/1999 | Complete – No issues | | 62426 |

Criminal History Review

| Date Completed | | Final Result | | Review Number |
|---|---|---|---|---|

| Home | | | | | | | | | | Close |
|---|---|---|---|---|---|---|---|---|---|---|
| | Send E-Mail | Reports | | | | | | | | |
| Applications | My Tasks | My Employees | Registration Snapshot | My Profile | My U4 Update | Initiate Process | Admin | Links | | |
| Search | Profile | Heightened Supervision | Documents & E-mail | Review History & Notes | Employee U4 Update | | | | | |

533

535

* Please note: If the following information is incorrect, visit the White Pages or HR Direct at 1-800-725-3535 to make an update.

Employee Name:     Show History    Registered: Yes
Officer Title: Other        Legal Entity: Charles Schwab & Co., Inc.
Supervisor Name:        Work Address:
Status: Active Show Employee Profile Details

Disclosures

Current DRP Pages
None

This section is REQUIRED for each U4 updates

○ No Disclosure Updates    ○ New Disclosure    ○ Update current DRP Page

If you are submitting a new disclosure or need to udate an existing DRP page please select the applicable form below. Please note, in addition to updating your U4 certain information must also be disclosed in EDO.

☐ Outside      ☐ Regulatory      ☐ Judgements/Liens      ☐ Civil Judicial
☐ Customer Compliant/Litigation/Arbitration      ☐ Information      ☐ Criminal

License(s)

Current License(s)
S7

Request License(s)

☐ Series 4    ☐ Series 6    ...    ☐ Series 86/87

State Registration(s)

Approved State Registrations

AL, AR, ... WV

Add State Registration

Select "AG" next to the state with which you need to be registered. Select "RA" only for the state(s) in which you are domiciled and only if you have the series 65 or 66 and need to be registered as an Investment Advisor Representative.

Request All States

| State | Agent | Reg Advisor |
|---|---|---|
| AK | ☐ | ☐ |
| AL | ☐ | ☐ |
| ... | ... | ... |
| WY | | ☐ |

Delete State Registration

| State | Agent | Reg Advisor |
|---|---|---|
| AK | ☐ | |
| AR | ☐ | |
| ... | ... | ... |
| WV | | ☐ |

History

Submit  Reset

FIG. 5AN
*(Continued)*

Employee Registration SnapShot

Home
Applications | Search | My Tasks | My Employees | Send E-Mail | Reports | Close
My Employees
Registration Snapshot | My Profile | My U4 Update | Initiate Process | Admin | Links — 538

Back to Top

Employee Name [ ]   Licenses [ ]   States:* [ ]   ACH Attendance Date [ ]

537

* Click here to see State Fee Schedule

*FIG. 5AQ*

| Home | | | | | | | | | Close |
|---|---|---|---|---|---|---|---|---|---|
| Applications | Search | My Tasks | My Employees | Registration Snapshot | My Profile | My U4 Update | Initiate Process | Admin | Links |

⌐540

Employee Name: Show History
Officer Title:
Supervisor Name:
Status:

Registered:
Legal Entity:
Work Address:

Hide Employee Profile Details

Compliance Profile

Registered Entity: None — Show History
SP Special Designation: No — Show History
Compliance Role: None
Beta ID(s): — Show History
Access to ART: No
NFA Registration Date: [  ] (mm/dd/yyyy)

Compliance Training
ACH Attendance: [  ] (mm/dd/yyyy)
IA Code Attendance: [  ] (mm/dd/yyyy)
NFA Ethics Due Date: [  ] (mm/dd/yyyy)
NFA Ethics Attendance: [  ] (mm/dd/yyyy)

ACM Not Required: ☐

Associated Locations

| Address | Start Date |
|---|---|

Show History

Regulatory Continuing Education

| CE Code | Status | Status Date | Window Start Date | Window End Date |
|---|---|---|---|---|

[Save] [Reset]

Registration Profile

Approved Registrations

Current DRP Pages
None

Approved State Registrations (S63, S65, S66)

Exam Windows

| Exam Code | Status | Status Date | Window Start Date | Window End Date |
|---|---|---|---|---|

Show History

[Save] [Reset]

| Home | | | Send E-Mail | Reports | | | Close |
|---|---|---|---|---|---|---|---|
| Applications | Search | My Tasks | My Employees | Registration Snapshot | My Profile | My U4 Update | Initiate Process | Admin | Links |

542

License(s)

Current License(s)
None

Request License(s)
☐ Series 4    ☐ Series 6    ...    ☐ Series 86/87

State Registration(s)

Approved State Registrations
None

Add State Registration

Request All States

| State | Agent | Reg Advisor |
|---|---|---|
| AK | ☐ | ☐ |
| AL | ☐ | ☐ |
| ... | | |
| WY | ☐ | ☐ |

Delete State Registration
None

History

[Submit] [Reset]

*FIG. 5AS*

WebEFT - Filings

Home >> WebEFT

| WebEFT Filing Results | WebEFT Log Files | Links |

Reports | Close

Filing Type: [Select a value ▾]

Status: [Select a value ▾]

CRD Number: [          ]

Filing Date: From (mm/dd/yyyy) [       ] 📅   To (mm/dd/yyyy) [       ] 📅

[Search] [Reset]

Back to Top

Search Results

559

| Firm CRD Number | File Name | Filing Date | Status | Name | CRD # | Reference ID | Description |

Home >> WebEFT
WebEFT Filing Results | WebEFT Log Files | Links
Reports | Close

WebEFT - Logs

Log Name: [Select a value ▼]

Status: [Select a value ▼]

Log Date: [From (mm/dd/yyyy) 📅]  [To (mm/dd/yyyy) 📅]

[Search] [Reset]

Back to Top

| View/Edit | Firm CRD Number | Application Name | Log Name | Log Date | Start Datetime | End Datetime | Status |

| AK ☐ AG | ☐ RA | AZ ☐ RA | ... | CO ☐ RA |

575

View / Edit

| Name |
|---|
| Paul Krish |
| Bala Kandula |
| Siva Natesan |
| Tony Yu |

Calculate  Save  Cancel

State Renewal Cost: $15,600.00
SRO Renewal Cost: $1,800.00
Total Renewal Cost: $17,400.00

| | Renewal Cost |
|---|---|
| | $1200.34 |
| | $234.00 |
| | $4500.20 |
| | $6999.00 |

564

Total Cost: $12933.54

Email
To: [employee]
From: [registration department of organization]

U-4 Registration Process & Disclosure
*Important information regarding your NASD WebCRD Reference Number*

The next step in the registration process requires you to access your U4 directly through Web CRD. In order to avoid any delays in becoming registered, it is imperative that you read and follow each step in these instructions. You should promptly access and complete your Form U4 to avoid the issue highlighted in Step 2.

Step 1
Access the WebCRD site: https://filing.crd.nasdr.com/crdmain/

Step 2
Read & Accept the "Terms and Conditions" of the WebCRD filing website.

Key in your assigned Reference Number 5239978399E4DF11 and click "Submit".

Please note: this # is valid for 60 days. If within the next 60 days your CRD record is accessed by another firm due to a Form U5 filing or any amendments to your Form U4 by a Regulator, the number becomes invalid and you must request a new reference # by contacting the Registration Hotline.

This will bring up the Form U-4. The first screen you will see is titled "General Instructions" (this is also the first tab called "Filing Instructions" in the navigation on the left side of the screen). The tabs on the left side of the screen identify the sections on Form U-4.

Step 3
Click on each of the tabs on the left navigation bar and review the information under each tab for accuracy. Please note that you will only be able to view areas 4 - 8 listed below, if any information is incorrect please notify the Registration Department. (4) SRO Registrations; (5) Jurisdiction Registration; (6) Registration Request with Affiliated Firms; (7) Examination Request; (8) Professional Designation Click on each of the remaining tabs noted, review for accuracy, and update as necessary. You will be able to modify information under the tabs listed below, however, if you add or change any information, please make sure you save the information. If you're already NASD registered, the tabs will have the latest information you provided on your last Form U-4 filing.

(1) General Information
    a) Enter your current employment date
    b) Under "Firm Billing Code", enter your cost center number
    c) Under "Office of Employment Address", click on "Add Registered Office of Employment Address";
    d) Under "Search by Branch Location", type in the City and State where you are currently located. Click on search.
    e) Locate your branch office. Click in the box under the "Add" column next to the correct branch office location. A check mark will appear in the box.
    f) Under the "Type of Office" column, you MUST select "Located At". Please disregard the "Supervised From" button.
    g) Repeat steps C - F to list ALL the branch locations from which you will routinely conduct securities business. You are required to keep this information current at all times.

(2) Fingerprint Information - The Registration Department will complete this section.

(3) Registration with Unaffiliated Firms

(9) Identifying Information/Name Change

(10) Other Names - Marriage, Divorce, etc.

(11) Residential History
        Create new resident address (if applicable) (Click on street address)
        Update existing residence address to show Month/Year moved
        Five (5) years of residential history must be provided

(12) Employment History
        Create new employment - enter Company name
        Update existing employment to show Month/Year employment ended
        Ten (10) years of employment history must be provided

(13) Other Business (outside business activities)

(14) Disclosure Questions

*If you have a "YES" answer to any questions, then you must also complete the corresponding Disclosure Reporting Page (DRP).

*For example, if a bankruptcy in the past 10 years is answered Yes (Question 14K1) then "Bankruptcy/SIPC" DRP tab on the left must be selected. Click on "create new Bankruptcy/SIP DRP" to create a new disclosure. Complete and save the information on the DRP.

*Disclosure Reporting Page (DRP) (only for Yes answers on Disclosure Questions)

(15) Signature Page
        *Applicant must type their name and the date in the "Applicant Signature" & "Date Signed" sections.

*In the Firm/Appropriate Signatory Line, type the date and the name of your Supervisory Principal.

*If item 15c is displayed, you must type in the date and your name.

Step 4

Select "Check Filing for Completeness" at the top of the left side.

If all items are completed, a message will show stating "U-4 Online Completeness Check Passed successfully". If there is incomplete information such as missing data, unanswered tabs, etc. a list will appear specifying the deficiency(ies). You must reselect the tab that is referenced and complete the updating of the information. Once this is done, select the Completeness Check again.

Once the Form U4 shows "Completeness Check Passed Successfully", you can then:

Step 5

Print the entire Form U-4. Click on "Print Preview"

*Click on "All Sections" (shown at the bottom left side of the screen)

*Click on the browser printer icon at the top right side next to the question mark

*Select Print and enter "all pages" with Portrait print style

Carefully read and sign the page(s) that shows the "Applicant Signature" next to your typed name and date and obtain your supervisor's signature.

Mail the Original Signed Form U-4 to the Registration Department. (SF120KNY-12)

NOTE:
In accordance with NASD Bylaws and Rules you are responsible for the information you submit on the U4 and it must be complete and accurate prior to printing and submitting.

Step 6

Click on the "SUBMIT TO FIRM" tab at the top of the electronic form. Your Registration Analyst will complete the registration filing when the original (hard copy) of the Form U-4 is received. Once you hit the submit button, you cannot make any additional changes. You must call the Registration Department Hotline at 877-_____ #2 to access your information again , or if you have any questions with this form.

In accordance with NASD Rule 3080, this disclosure is presented whenever you are asked to sign a new or amended Form U-4.

The Form U-4 contains a predispute arbitration clause. It is in item 5 on page 4 of the Form U-4. You should read that clause now. Before signing the Form U-4, you should understand the following:
*[ text explaining predispute arbitration clause]*

SYSTEM AND METHOD PROVIDING FOR REGULATORY COMPLIANCE

RELATED APPLICATIONS

The present application claims benefit from U.S. Provisional Patent Application Ser. No. 60/847,405, filed Sep. 27, 2006 entitled SYSTEM AND METHOD PROVIDING FOR REGULATORY COMPLIANCE, which is incorporated herein by reference.

FIELD OF THE INVENTION

The present invention relates generally to a data processing system and method for tracking and implementing processes in a computer network to provide for efficient compliance operations in a regulated organization.

BACKGROUND

Many organizations operate in highly regulated fields of business. One industry which is highly regulated is the financial services industry. For example, in a brokerage company, many of the employees of the brokerage company are required to have one or more licenses in order to engage in the activities required by their jobs. Depending on a particular individual's job within the organization an individual may need to have passed a number of different tests and hold a number of different licenses. Examples of some regulatory compliance licenses in the brokerage industry are the Series 7, Series 26, Series 27 etc.

When a new employee is hired by a brokerage company, the brokerage company is required by various regulations to conduct a number of different investigations in connection with the new employee's background and criminal history. These regulations are in some cases set forth by one or more different governmental agencies, and can further be required by statute, and additional requirements can be mandated by various non-governmental, or quasi-governmental agencies, and additionally organizations may further implement additional compliance type processes above and beyond those required by various different external organizations.

Much of the discussion herein is directed to the compliance requirements which a brokerage company must comply with. However, it should be recognized that large organizations can now provide for a multi-faceted range of services, including banking, mortgage brokerage, investment banking, and the brokerage of a range of different types of securities. Hence much of the discussion herein will refer to an organization generally as opposed to specifically referring to a brokerage company.

The range of different regulations which an organization must follow is vast. In the past, many organizations used a range of different systems to comply with the applicable regulations, and to implement processes and business rules which were intended to provide for compliance with the requirements of the myriad of different regulatory requirements. In the past these systems were typically implemented using a range of different computer systems and manual processes. In the past, in order to understand an organization's present state with regard to complying with the vast array of different requirements, typically a number of different departments in the organization would need to coordinate searching and reviewing a number of different databases, and paper files. Further, in order to insure individuals within the organization were taking appropriate actions to provide for compliance with various regulations, a number of improvised and frequently manual processes were implemented. In some circumstances these different processes were not well coordinated, and they frequently required access to the same information, but these processes would work off of separate databases, and electronic files, and physical files.

Further complicating the situation is the fact that the regulations frequently change and such changes would then require an assessment of which of these disparate processes would need to be modified or update in order to comply with the changes in the regulations.

BRIEF DESCRIPTION OF THE DRAWINGS

FIGS. 4A-4B illustrates an embodiment of different processes of the invention herein, and illustrates different relationships between different embodiments of different processes of the invention herein.

FIGS. 6A-C illustrates views of an embodiment of a sample email sent to an employee with instructions as to filling out an electronic U4 form provided on an interface page shown on the employee's computer.

DETAILED DESCRIPTION

Figure 1:
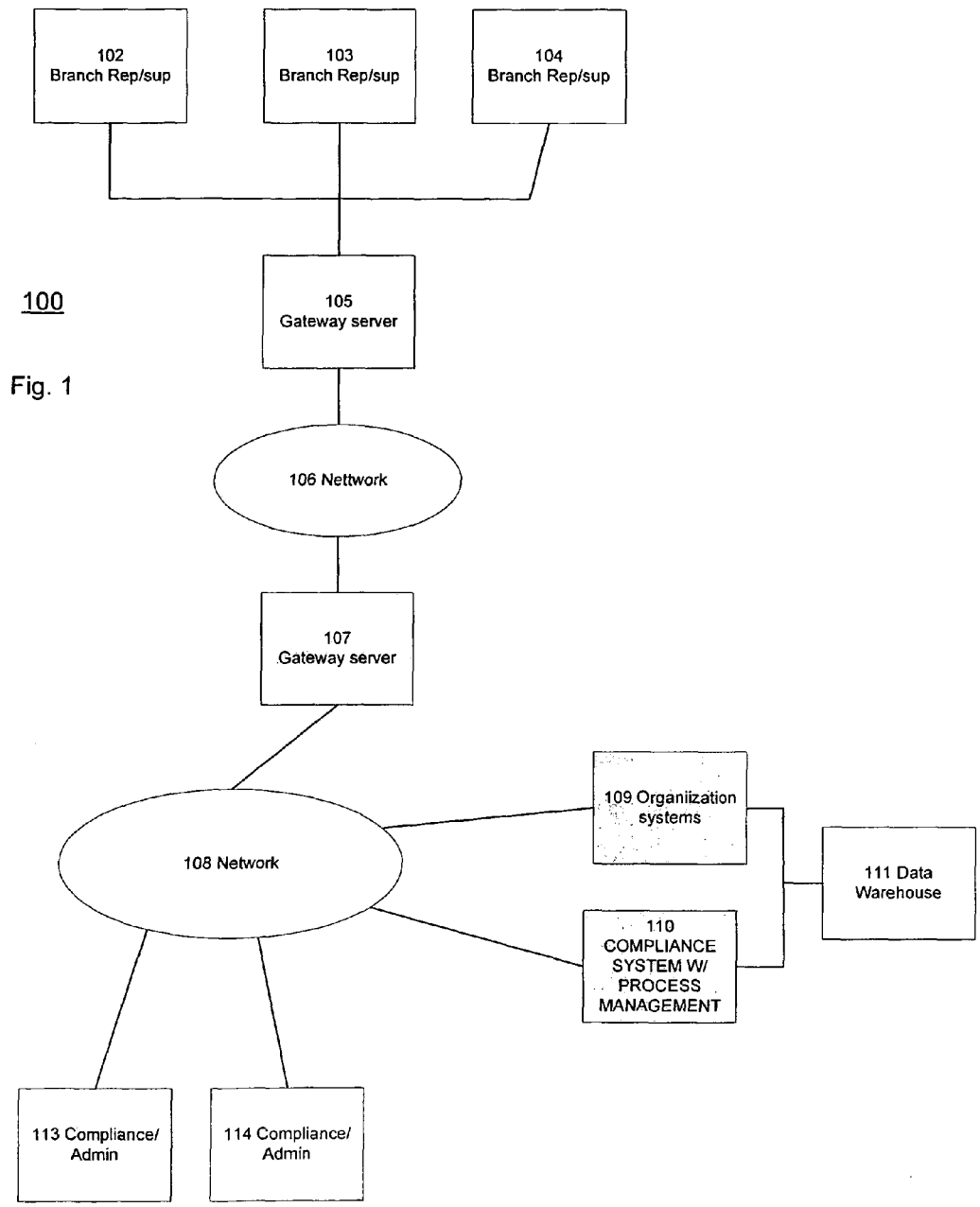
FIG. 1 illustrates a configuration of system of an embodiment of the present invention.

FIG. 1 illustrates an overview of aspects of one possible embodiment of system 100 of the present invention. Computers 102, 103 and 104 can be provided in a branch office of an organization. Where the organization is brokerage company these computers could be computers which are accessible to customer representatives who communicate with customers in connection with providing financial advice, and in connection with receiving customer instructions for the buying and selling of different securities, and other financial transactions. These computers can also be used by the customer representatives and their supervisors and the branch offices to access selected functions in organizations backend or central processing systems.

The computers 102, 103 and 104 can be connected via a gateway server 105, or other network equipment such as a router, hub, switch or other device to a communication network 106. The communication network 106 could be LAN, WAN or a secured encrypted connection through the internet.

The organizations backend or central processing systems can include a number of different computer systems which run a number of different software applications which provide a number of different services. These various different computer systems can be connected to each of other through different networks such as LANs, WANs, and in some cases these connections can be provided for using the internet. Typically different routers, switches, and hubs are provided for various interconnections between the various computer systems. In the embodiment shown in system 100, the communication network 106 is coupled to the organizations backend systems by a gateway server 107, or other computer system which provides access to the backend systems. The gateway server 107 is coupled to the network 108. The network 108 then provides for communications between the various computers of the organizations backend systems. FIG. 1 shows a simplified view of the backend systems which include a plurality of organization computer systems 109. The organization systems 109 can include computer systems running software applications which provide for services such as controlling communications and transactions with various financial exchanges and networks where securities are traded, and for accessing services which provide for exchanging regulatory compliance information with different regulatory agencies, and for services which provide for tracking human resource and accounting information, and for services which provide for tracking and controlling customer and employee financial account information.

The backend computer systems of 100 also includes a compliance computer system 110 which includes a compliance process management software application. The various computer backend applications and systems also include different databases, and much of this information is accessed and utilized by more then one of the backend systems. In addition to different computer systems a centralized data warehouse computer system 111 can be provided which operates to provide for the exchange of some types of information between the different computer systems. Additionally, the system can provide for a plurality of user client computer systems 113 and 114, and the users of these client computer systems can be provided with different levels of access to the different backend computer systems running different software applications and providing different services.

Figure 2:
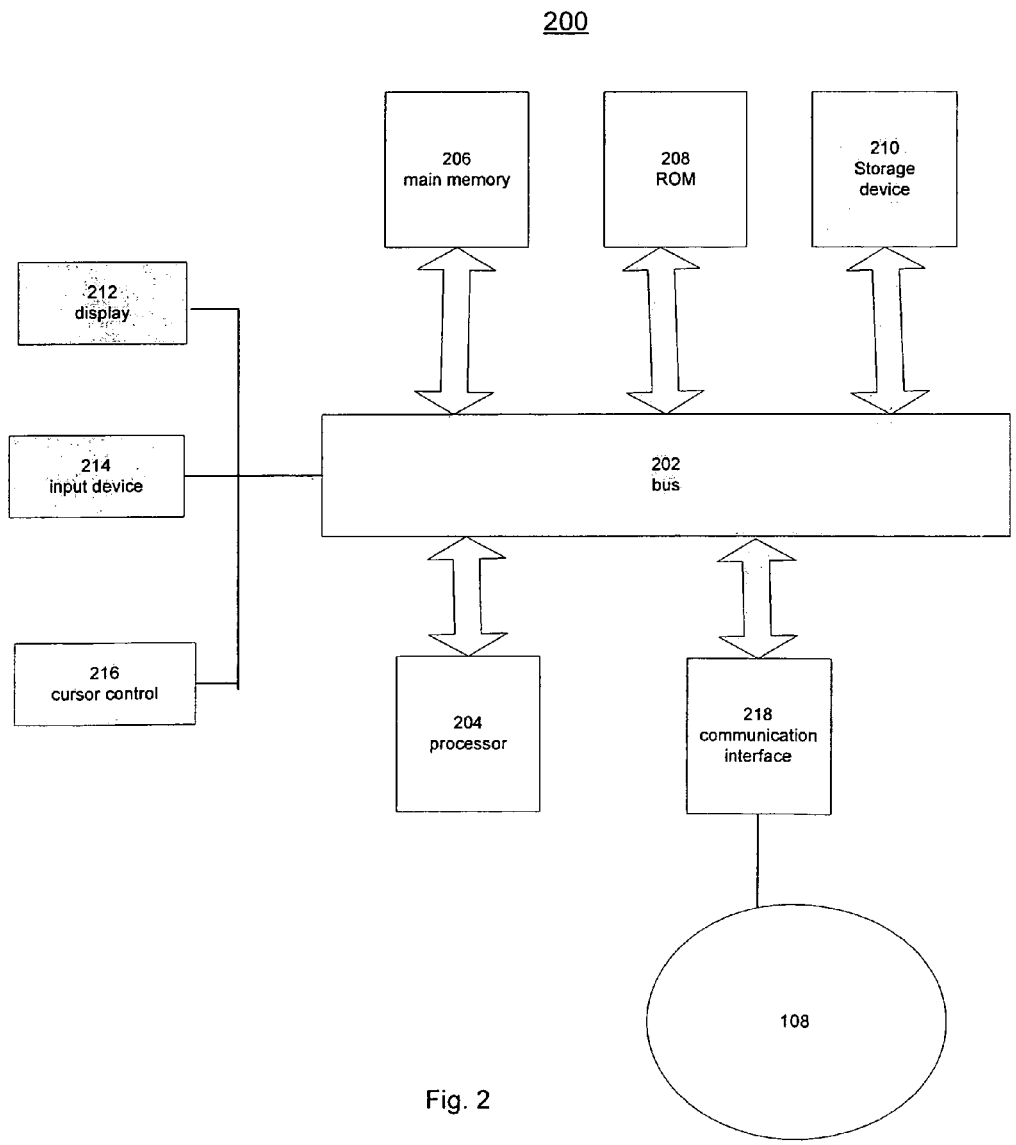
FIG. 2 illustrates a typical general purpose computer of the type representative of an embodiment of a computer used in an embodiment of the present invention.

FIG. 2 provides a general description of elements of computer system. These basic elements are generally components of each of the different computer systems described above. Computer system 200 includes a bus 202 or other communication mechanism for communicating information between the different elements of the computer system, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 202. Computer system 200 further includes a read only memory (ROM) 208 or other static storage device coupled to bus 202 for storing information and instructions for processor 204. A storage device 210, such as a magnetic disk or optical disk, is provided and coupled to bus 202 for storing information and instructions.

A display 212 can be coupled to the bus 202 displaying information to a computer user. As discussed below images shown on the display to convey information to a user can be referred to as screen shot, or an interface page. Additionally, although not shown in FIG. 2, a printer could also be provided as another user interface device which allows a user to print out hard copies of the various screen shots, or interface pages, and reports and other information which is provided by the operation of the processor. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212.

The invention provides for the use of computer system, or a plurality of computer systems connected together via one or more communication networks, which provides for implementation of regulatory compliance processes, and for tracking information related to the regulatory compliance processes. According to one embodiment of the invention, different regulatory compliance processes are performed using a computer system to store and analyze regulatory compliance information pertaining to employees of an organization. In one embodiment, the regulatory compliance processes are defined in part by the execution of the sequences of instructions contained in a main memory 206 by the processor 204, where the system 200 describes basic elements of an embodiment of the compliance system 110 shown in FIG. 1. One or more processors in a multi-processing arrangement may also be employed to execute the sequences of instructions contained in main memory 206. In alternative embodiments, hard-wired circuitry may be used in place of, or in combination with, software instructions to implement the invention. Thus, embodiments of the invention are not limited to any specific combination of hardware circuitry and software.

Computer system 200 also includes a communication interface 218 coupled to bus 202. Communication interface 218 provides a two-way data communication coupling to the network 108.

As one skilled in the art will recognized the different computer systems shown in FIG. 1 which are connected together as part of a distributed system of the organization could be implemented using a number of different types of computers, including for example personal computers running the XP operating system from Microsoft, server computer systems, and mainframe computer systems.

Figure 3:
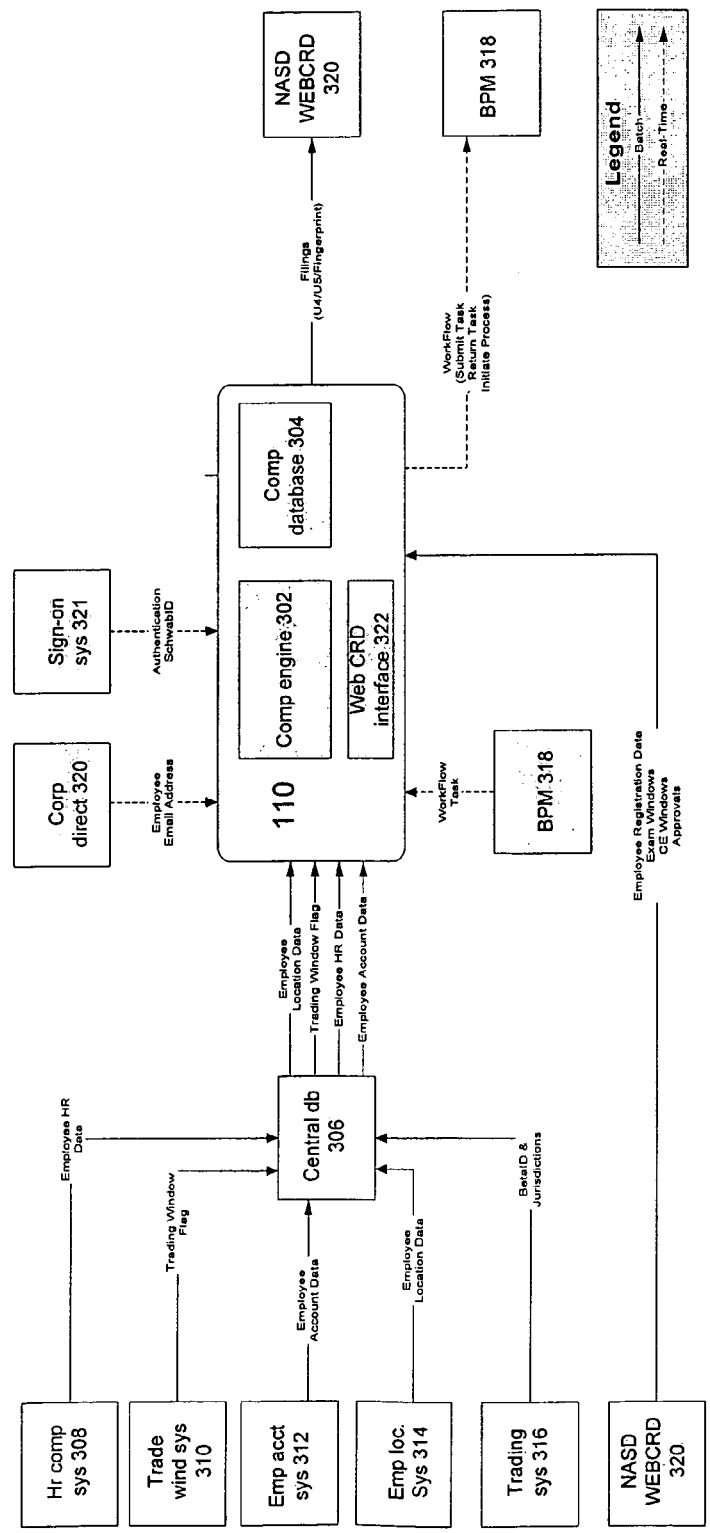
FIG. 3 illustrates an embodiment of the system of the present invention.

FIG. 3 illustrates aspects of an embodiment of a system of the present invention. A plurality of computer systems can be included in the backend systems of the organization, where the backend systems in FIG. 3 are shown from the perspective of the compliance system 110 of FIG. 1. In one embodiment the compliance system 110 would correspond to a computer where the processor is programmed to include a compliance engine 302 which executes regulatory compliance processes, including the generation of various reports, generating emails, tracking compliance processes, and providing different interface pages to different users of the organizations backend systems. In referring to processor of the compliance system providing different interface pages to users of the compliance system it should be recognized that the processor could provide for operation in a number of different ways: for example the processor could generate an HTML page, or other type of page which could be transmitted to a client computer which is used to the display the interface page to the user, or in some instances the processor of the compliance system could function to obtain the underlying information which is displayed in the interface page which is presented to the user, and in either of these instances the processor of the compliance system would still be considered as providing the interface page to the user. In the context of the discussion herein various different specific modules implementing different process will be discussed below. In the context of this present discussion of FIG. 3, many of these different specific modules would be incorporated into the operation of the compliance engine, and are not shown separately in FIG. 3. The compliance system 110 can also include a compliance database 304 which operates store certain regulatory compliance information.

In one embodiment a central database system 306 is provided. The central database system can be implemented as a computer system which is coupled with a large non-volatile information storage device such as a configuration of interconnected hard disk drives. Different systems of the organizations back end computer systems can transmit data to the central database 306, sometimes referred to as a data warehouse. The data warehouse information can then be accessed by the compliance system 110.

A human resource computer system 308 operates to provide employee human resource information to the data warehouse. The human resource information that can be provided by computer system 308 to the Data Warehouse includes: employee identifying information, such as Social security number, internal organization identifications number; personal details, such as name and address; employment information, including Legal Entity, Department, Job Code, Start Date, Termination Date; information identify employee's supervisor information; and status information, including leave of absence reasons. The compliance engine 302 will operate to monitor the human resource information in the data warehouse, and in response to changes or updates in the human resource information, the compliance system can initiate certain regulatory compliance processes. For example, in response to information indicating a new employee has been hired, the compliance system can initiate a new employee hire disclosure process, and then provide for initiation of an annual disclosure process on the year anniversary of the employee being hired; or otherwise changed employment status, and initiation of new hire registration processes; and providing for ad hoc filings of employee information to regulatory agencies; and initiation of regulatory termination process when and employee is terminated.

A trading window computer system 310 provides securities trading information to the data warehouse where it can be accessed by the compliance system 110. The securities trading information provides trade routing information to the data warehouse so that it can be accessed by the compliance system 110 so that it can be used to generate disclosures pertaining to trade routing rules, and provide for search functions on trade information using employee identifying information as criteria for some of the searches.

An employee account computer system 312 will provide employee financial account information to the data warehouse 306. The employee account information can be used in part of the employee disclosure process of the compliance system. For example, information from the employee account records can be used to pre-populate information in selected data fields and disclosure forms used by the employee.

An employee work location computer system 314 will provide employee work location information to the data warehouse, and the compliance system can access this information, and automatically provide updated employee work location information to pertinent regulatory authorities to notify such authorities of a change in an employees work location.

A customer representative trading system 316 provides a list of employees which are identified by a trading system ID, and the listing of the states in which each of the employees have obtained required regulatory compliance licenses for trading, to the data warehouse 306. This trading system ID and state approval information is used by the compliance system to provide discrepancy reporting against NASD approved states for employees. The NASD approved states for the employees can be down loaded directly from the NASD Web CRD system.

The customer representative trading system 316 can include an outbound interface module which operates to create the employee trading system IDs and to associate the trading system IDs with the states which the employees are authorized to trade in, where this information is received from the NASD (National Association of Securities Dealers. In one embodiment the outbound interface can communicate through the internet with computer systems of the NASD to receive the state trading approval information.

A corporate directory computer system 320 can be provided which is directly accessible by the compliance system 110. The corporate directory computer system provides a database which includes employee information such as employees' job titles, phone numbers and email addresses. The compliance system 110 can be provided with an interface such that it can directly access the information in the corporate directory system and use the email information to provide different email alerts and notices to employees in connection with specific regulatory compliance processes.

Incorporated into the compliance system can be business process management software module 318. It should be noted that BPM 318 is not shown within the lines of compliance system 110 box, however, the BPM could be incorporated to the software code which is being run on the compliance system 110, and can be considered to be part of the operation of the compliance system. Indeed, as discussed herein the various computer systems which are identified could be implemented such that the operations of the various systems are consolidated into a reduced number of computer systems, or alternatively the various tasks of the different system could be further divided into implementation on an increased number of discrete computer systems which are networked to operate together to provide for the various functions described herein. The business process management module can include a number of different elements. The BPM can include software code from a business process management tool such as provided by Ultimus Inc. of Cary, N.C. The software code of the generic business process management tool can provide for the basic tracking and implementation of defined process; and the BPM tool is then integrated with organization specific software code of business rules which defines the various specific operations of the regulatory compliance process which are used by the organization to ensure compliance with regulatory requirements. As will be discussed in more detail below the compliance system 110 operates to implement a number of different regulatory compliance processes. These processes are in many instances processes that are conducted over a number of days, weeks, or months and can be on-going and updated on a periodic basis. The compliance engine 302 operates in conjunction with the BPM 318 to provide information to different users of the system. For example the compliance engine will generate interface pages, which are provided to users of the compliance system, and through these interface pages users can do searches and make queries to the system to determine the status of different processes and to retrieve regulatory compliance information, and generate compliance reports.

In response to a user inquiry on a particular regulatory compliance process, the BPM module will review the status of the particular regulatory compliance process based on the data from the compliance data base. The BPM 318 will provide this status information to the compliance engine 302 which will then generate an interface page to present the user with the requested information.

The compliance engine 302 will also operate to receive user sign-on information from the sign-on system 321 when a user enters the compliance system. The compliance system provides for tracking the job code assigned to different users of the system and the user is provided with a level access to the compliance system information which corresponds to a level of access provided for the user's particular job code.

The users of the compliance system 110 can submit information for different regulatory compliance tasks to the compliance system through interface pages, and these submitted tasks will be forwarded to BPM module 318 which will then use the business rules to determine the next step in the regulatory compliance process.

The regulatory compliance system 110 can also be provided with an interface which allows it to receive user sign on information from an organization sign-on system 321, which allows a user to sign-on the organizations backend systems a single time, and then as the user accesses different computer systems and software applications of the organizations backend systems the user's identification information and sign-on information, which can include a password and a user ID is passed from application to application, or system to system so that a user need only sign on a single time.

Figure 5A:
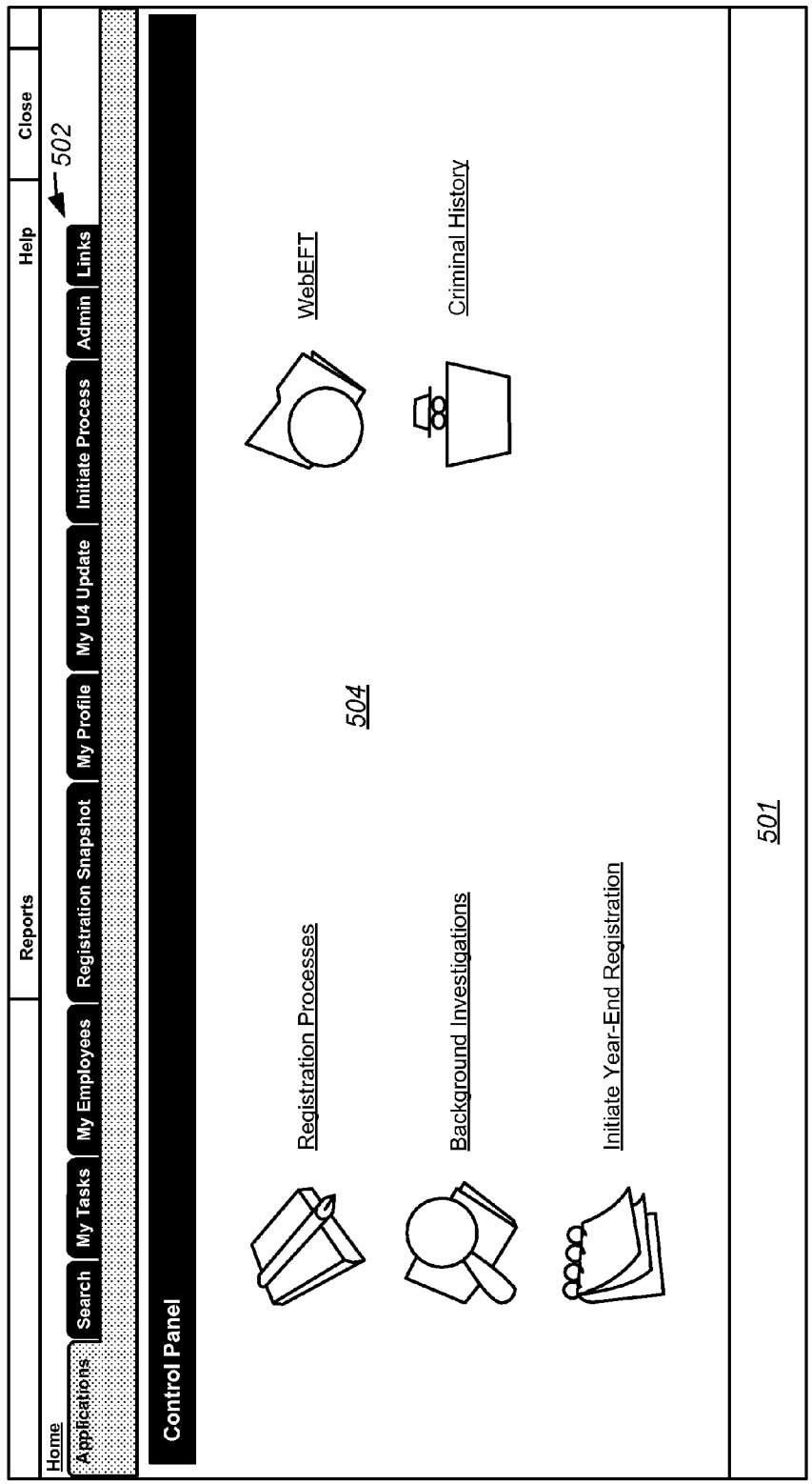
FIGS. 5AA-5BH illustrate different views of interfaces pages of an embodiment of the invention herein.
Figure 5A:
Figure 5A:
Figure 5A:
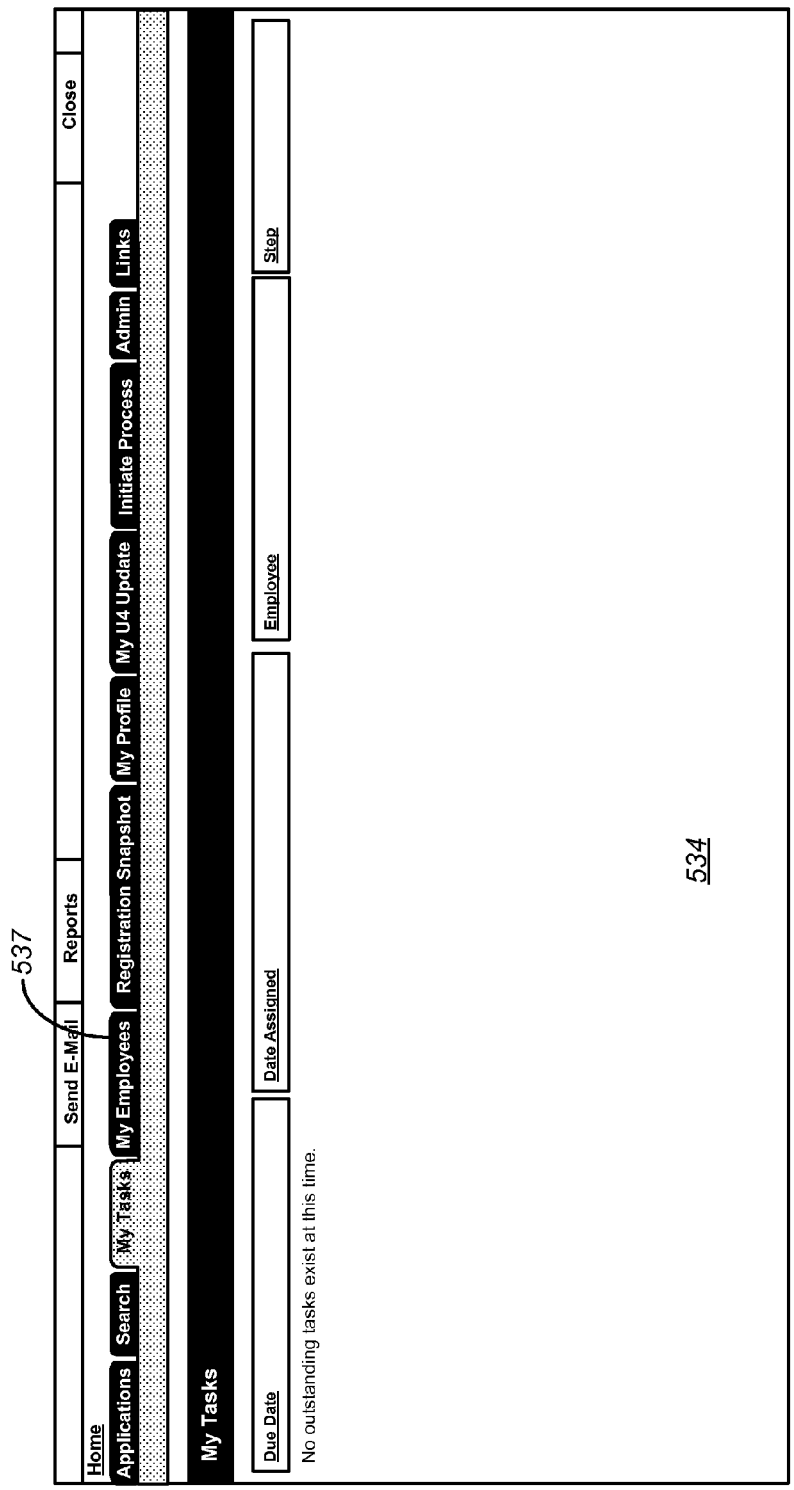
Figure 5A:
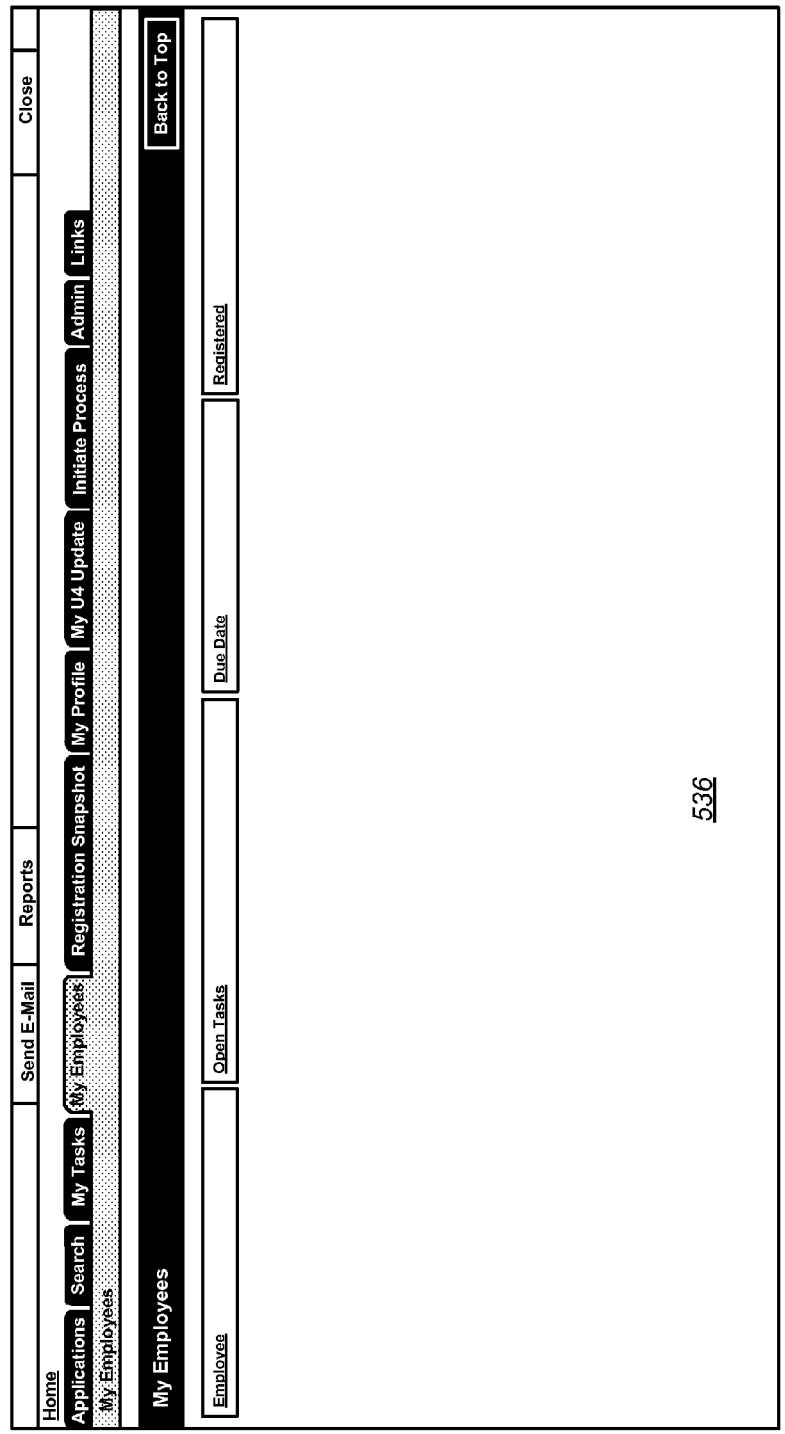
Figure 5A:
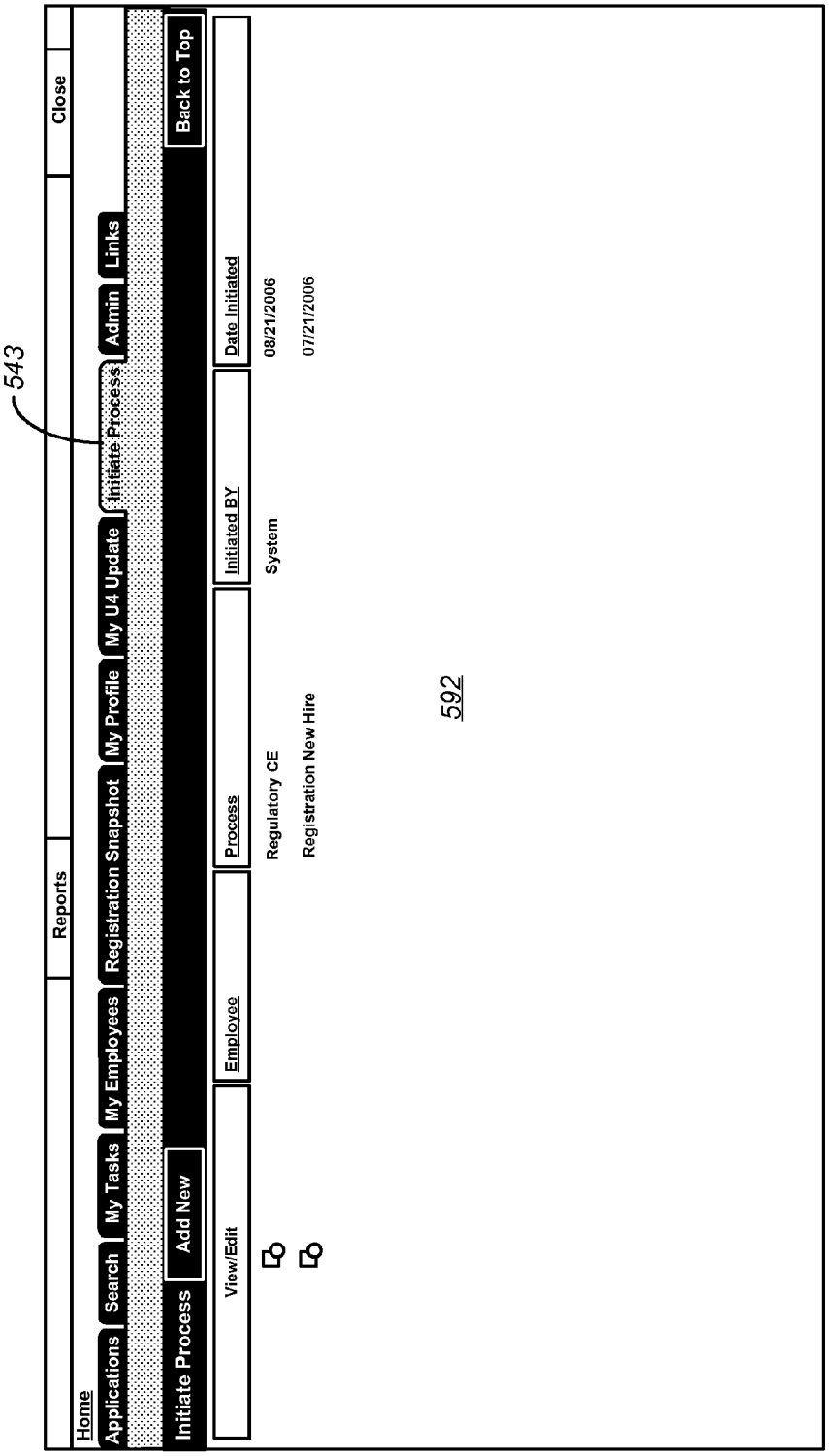
Figure 5A:
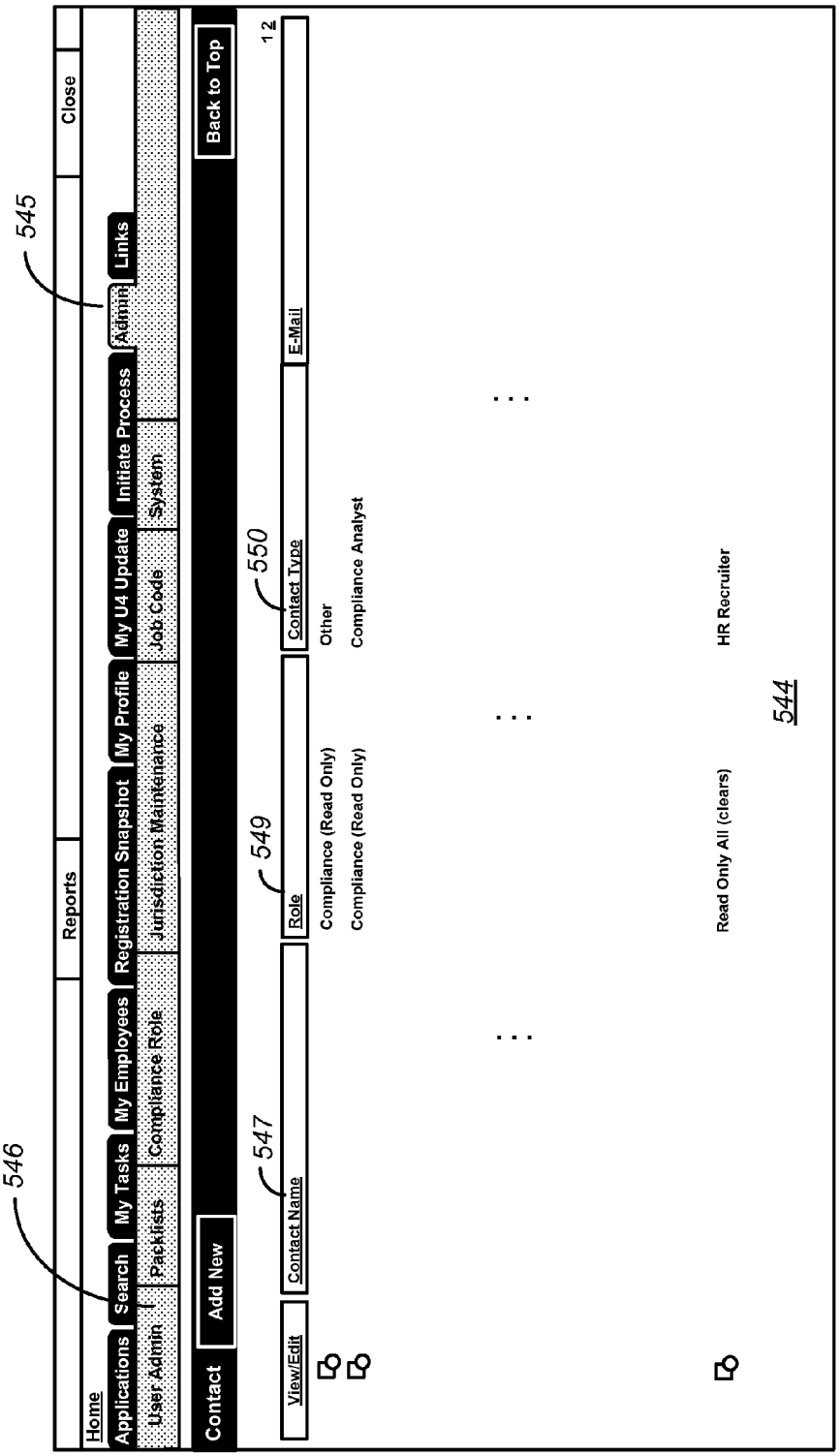
Figure 5A:
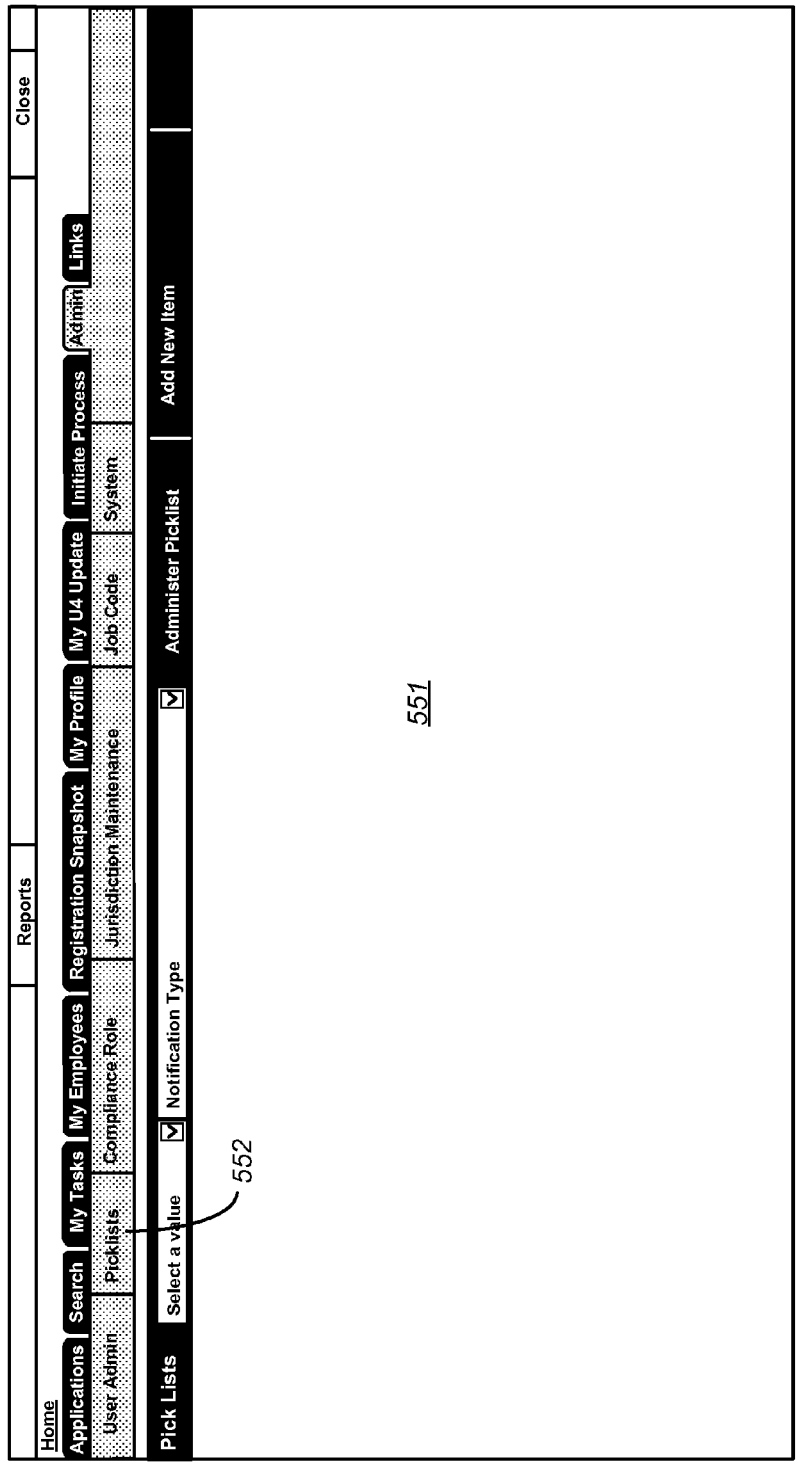
Figure 5A:
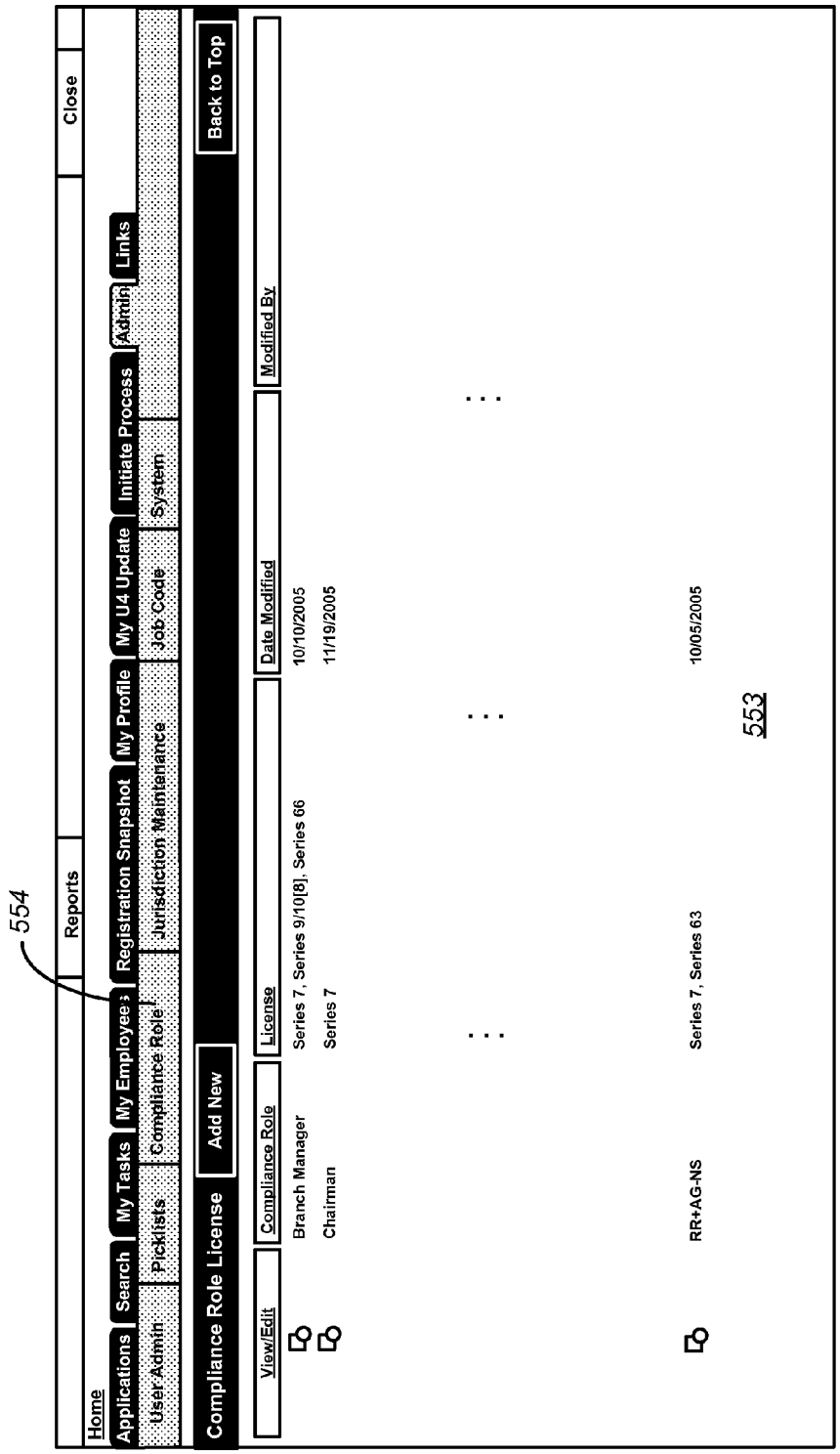
Figure 5A:
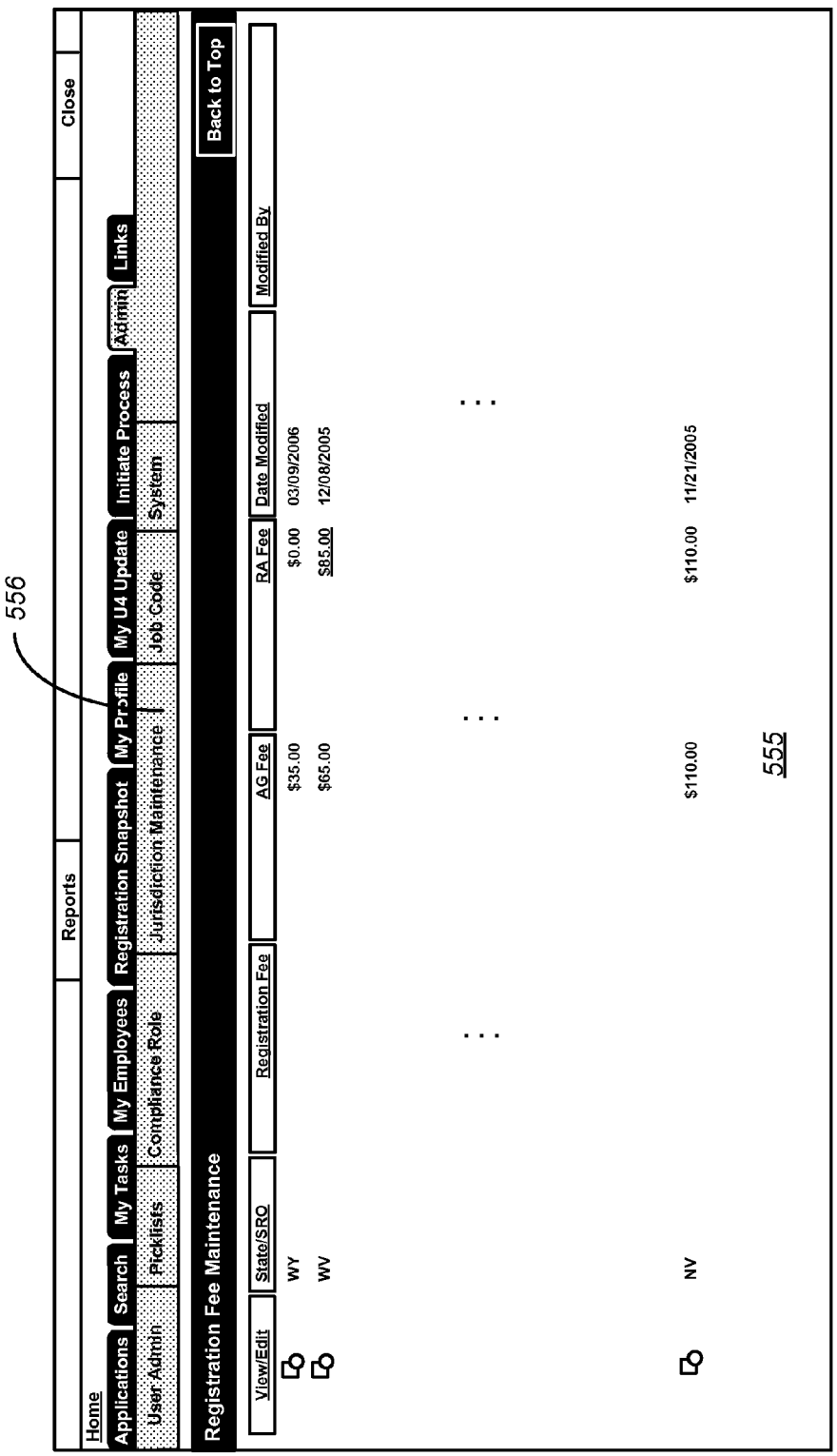
Figure 5A:
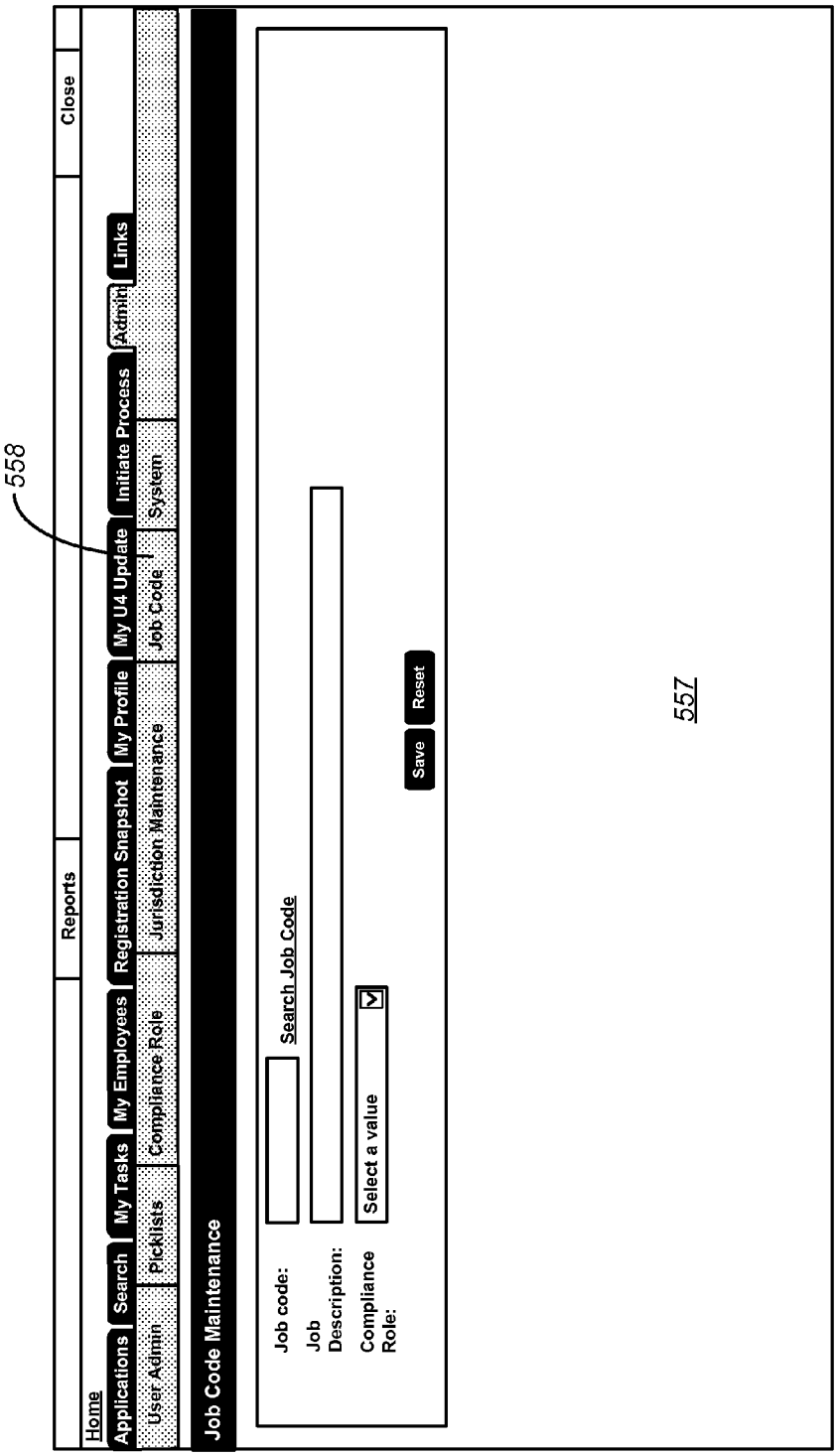
Figure 5B:
Figure 5B:
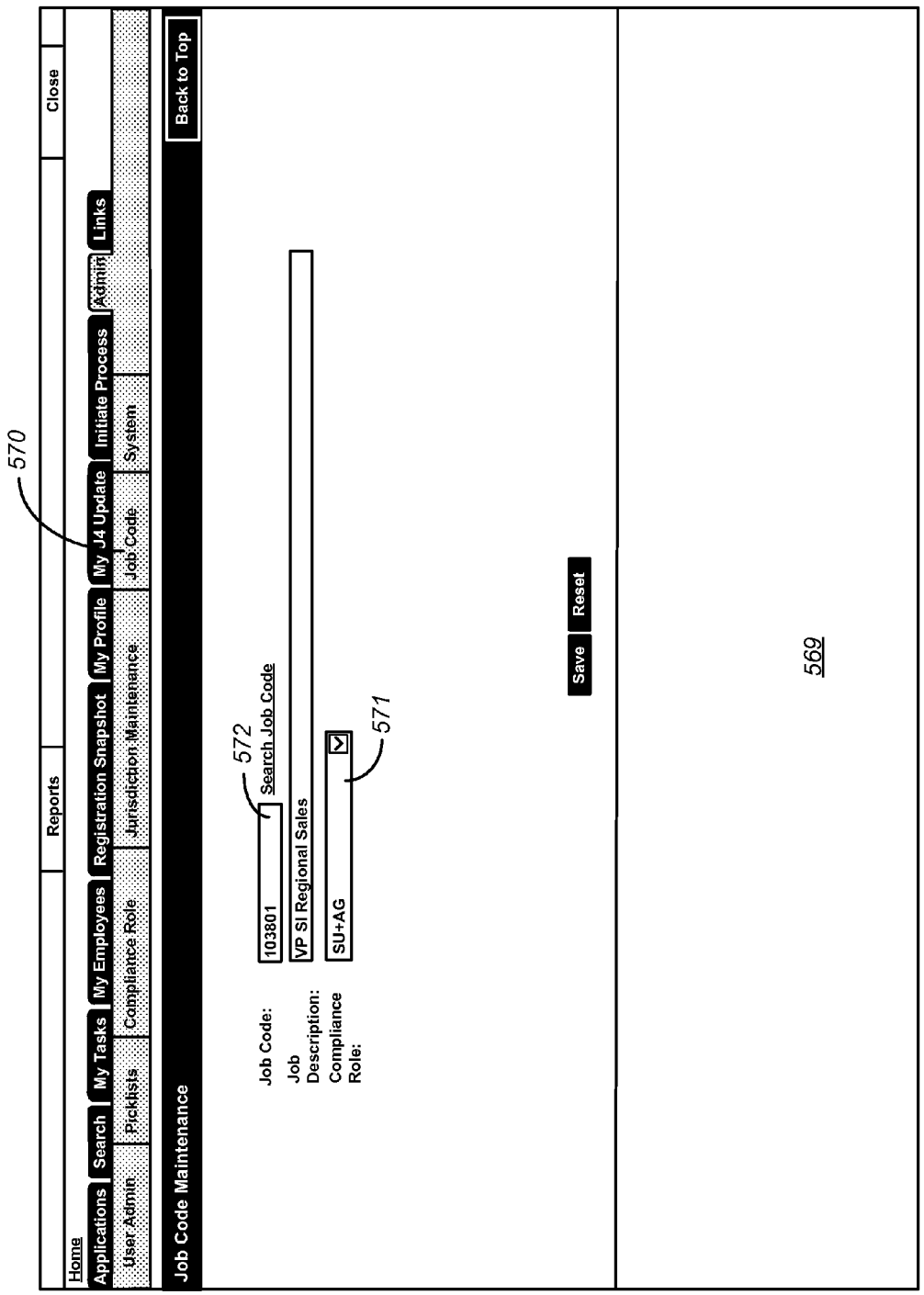

The compliance system 110 can also be provided with a WebCRD interface 322. The WebCRD interface operates to provide for data transfers to and from the NASD Web CRD system 320. The NASD Web CRD system is used to provide authoritative information regarding regulatory compliance information for employees of the organization, such as registration information which identifies regulatory compliance licenses held by employees of the organization, and identifying states in which employees are authorized to trade securities. The WebCRD interface operates to use electronic file transfer protocols to transmit and receive information from the NASD Web CRD system 320, and the compliance engine utilizes the information transmitted through the Web CRD interface 322. The NASD Web CRD system is a computer system external to the organizations computer systems, which is operated by the NASD and contains extensive regulatory compliance, and regulatory compliance licensing information. Information can be submitted to the NASD Web CRD system using electronic regulatory compliance forms; these forms include: U4 forms which are used to provide information for employees such employment history, identification of states in which is an employee is registered, identification of licenses held by an individual; address information for the employee; also requests by an employee to obtain a new regulatory license; annual disclosure information, and ad-hoc information disclosures for an employee. Another form is a U5 form which is submitted to the NASD Web CRD system when an employee is terminated. Another form is a 3070 form which is used in some circumstances when an employee is terminated. FIG. 5AS illustrates an interface page 541, which can operate as an electronic form, or interface page, which can be presented to an employee of the organization through the compliance system. The interface page 541 is filled out, or updated, by an employee to request access to an interface page which allows the employee to make U4 amendments in a U4 form in connection with requests to update the employees regulatory and compliance information. In some circumstances, as will be discussed below, the information input by the employee into page 541 can be transmitted to the NASD WebCRD system without requiring further input by the employee. This page 541 provides the employee with fields to input information regarding the type of regulatory compliance information which the employee is trying to update; for example the form can provide fields where a user can input selections to indicate that the employee would like to obtain additional regulatory licenses, or a state license registrations. In response to an employee inputting U4 amendment type information through the interface page 541, the information is received by the compliance system and saved in the compliance database; a notification of the request for the U4 amendments can be provided to the supervisor of the employee, and if the supervisor approves, the user's request can be forwarded to the NASD WebCRD system, or the user could be provided with an access number to access the NASD WebCRD system to input the updated U4 information through an electronic U4 form which is provided as an interface page to the user. As will be discussed in more detail below the information input to the U4 can then be submitted to NASD Web CRD system. FIG. 5BH shows an interface page 573 which corresponds to a U5 form, where a U5 form is a form which is used to submit information to the NASD WebCRD system when an employee's employment with the organization is terminated.

The compliance system 110 uses the information from the NASD Web CRD system 320 as authoritative information, and downloads different reports from the NASD Web CRD system on a periodic basis as shown in examples included in Table A below:

TABLE A

| Report Name | Desctiption | Download Frequency |
|---|---|---|
| Post Approvals Report | This report contains data of the firm's individuals who have been approved for a specified day e.g. identifies licensees and states in which licensed employees are registered. | Daily (Mon-Fri) |
| Post Deficiencies Report | This report contains data of the firm's individuals who have deficiencies holding up registration approvals for a specified day. | Daily (Mon-Fri) |
| Post Enrollments Report | This report contains data of the firm's individuals who have exam enrollments or exam enrollment window changes for a specified day. | Daily (Mon-Fri) |
| Post Exams Report | This report contains data of the firm's individuals who have exam results for a specified day. | Daily (Mon-Fri) |
| Post Pending Report | This report contains data of the firm's individuals who are pending for a specified day, and provides information on those employees having a pending registration with a regulatory agency, or with a state. | Daily (Mon-Fri) |

TABLE A-continued

| Report Name | Desctiption | Download Frequency |
|---|---|---|
| Post Termination Report | This report contains data of the firm's individuals who have been terminated for a specified day. | Daily (Mon-Fri) |
| Individual Information Report | This report contains data of the firm's individuals currently employed by the requesting firm. This report is zipped using Winzip. | Every Two Weeks |

In addition to the above business related reports, additional system status reports can be downloaded to manage exception processes. The download process (Download from the NASD Web CRD system and Import to the compliance system) will automatically download the reports, and store them in the compliance database 304 on a scheduled basis. The schedule can be modified to suit the business practices.

The Web CRD interface 322 can provide for Web EFT Uploads, where these uploads are mechanisms for performing automated filings in Web CRD from compliance system. The following types of filings are examples that can be included in the upload process: full U5 form submission; full U4 submission; partial information in U5 form; a U4 amendment to amend information contained in a previously submitted U4 form; updating or inputting fingerprint information at termination, or employment. The U4 amendment information can include: Jurisdiction Change Cost Center Change; Name Change; work Address Change; Home Address Change; and License Requirement Change.

Figure 4B:
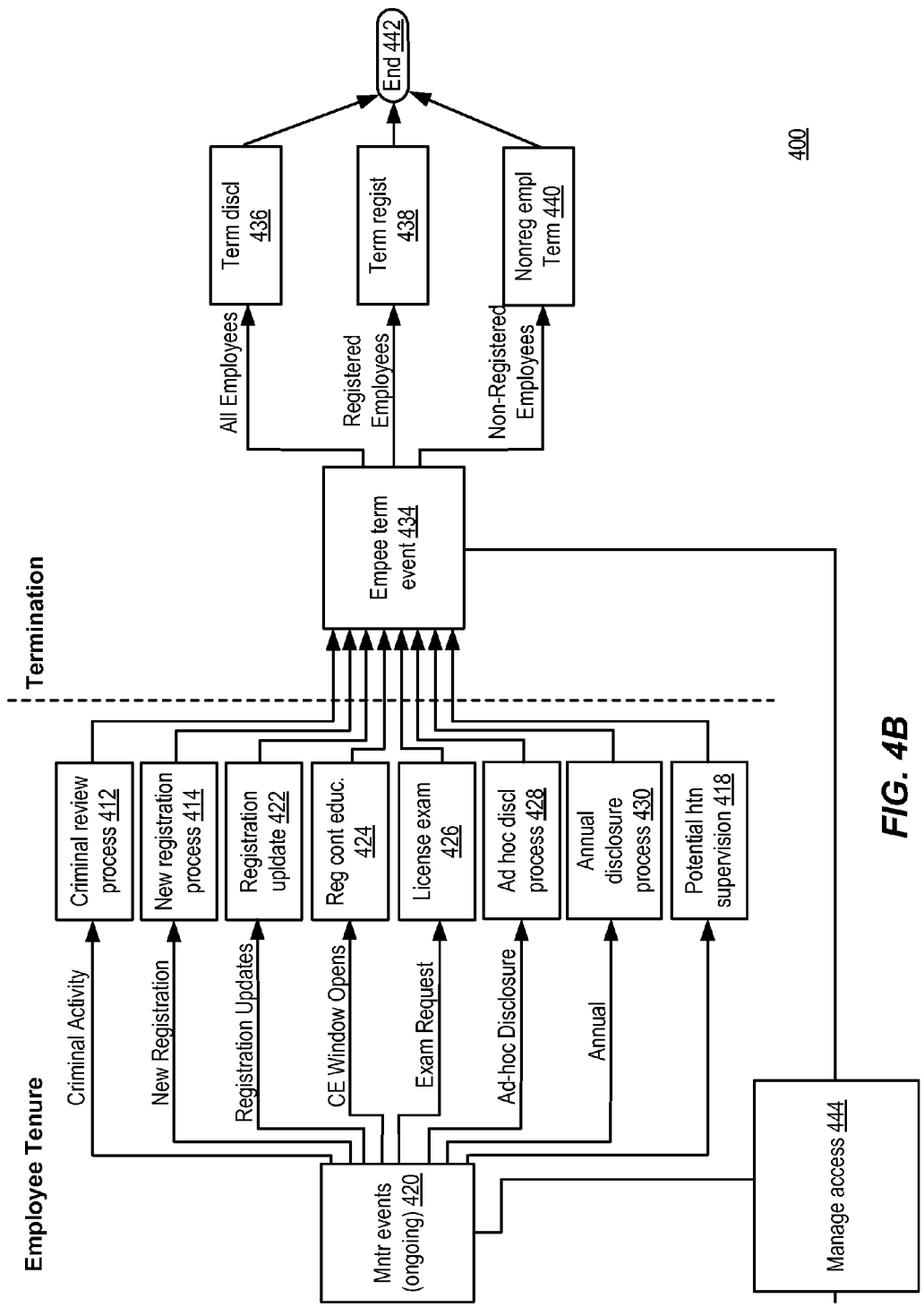

FIGS. 4A-4B illustrates aspects of a process 400 for an embodiment of method of the present invention. This process can be a computer implemented process. The process 400 includes implementing a number of different sub-processes, and operates to manage regulatory compliance issues for employees through their entire tenure with the organization (pre-hire, new-hire, on-going employment, termination). At step 402 a job applicant submits an employment application. The employment application form can be a paper form which the applicant fills out manually and the applicant information, such as personal information name, social security number, employment history, education and so forth, and regulatory compliance information such as an identification of different licenses and states in which the applicant is registered, and a wide range of other information from the job application form which is input to the HR computer system. The job application form can also be filled out electronically, and the information entered into the application form by the applicant can be automatically entered into the HR computer system. Information related to the new job applicant is then forwarded from the HR computer system to the central database; the Compliance system will in response to the new job applicant information initiate a background investigation process, where a compliance employee of the organization will review background information for a job applicant. The compliance employee will access various interface pages through the compliance system and input information through the background investigation interface pages, and this input information will be stored in the compliance database, for later retrieval and tracking.

In some instances in parallel with the background investigation process, the new job applicant will be going through the interviews with other employees in the organization. If the decision is made to hire the job applicant then the information in the HR computer system will be updated to indicate that the job applicant has been hired, and this information will be sent to the central database. If the job applicant was not hired then the process is terminated 408; however, the information from the background investigation can be stored in the compliance database, so that it can be accessed and reviewed if the job applicant subsequently applies for another position at a later date.

If the job applicant is hired then the information in the HR system will be updated to indicate that the applicant has been hired. At this point in time, if a job code has not yet been input to the HR system for the job applicant, then a job code should be input to the HR system. The job code information, and the information indicating the hiring, would then be transmitted to the data warehouse. The compliance system upon receiving an indication of the hiring 406 of the Job applicant would then initiate a number of different new hire regulatory compliance processes. Thus, the receipt on information into the data warehouse operates as an initiating event which initiates operation of the evaluate new hire processes 410. One of the new hire processes is a criminal review process 412 that can require obtaining fingerprints for the new hire, and a review of criminal history records. The criminal review process 412 can also be initiated if there is some indication in information received from the NASD Web CRD system 320 that there has been some change in criminal information in connection with a particular individual. The criminal review process can include prompting a compliance employee to access criminal history interface pages through the compliance system. The compliance system will include in the compliance database a listing of criminal convictions which operate to statutorily disqualify an individual from employment in particular fields in the securities industry. If such a criminal record is identified for a particular person, the criminal review process will generate an alert specifying the issue, and can generate emails prompting compliance and/or HR personnel within the organization to take appropriate action.

Another new hire process is a new hire registration process 414, which can be initiated by receipt of an indication that a person has been hired. The new hire registration process includes reviewing the job code for the new hire, and the compliance database correlates different job codes with different compliance roles which have different corresponding licensing requirements. The licenses required for the new hire's job code are compared against the licenses held by the new hire and if the new hire does not have required license then the new hire will automatically be sent an email indicating actions which the new hire must take to obtain the required licenses. Additionally, even in situation where a new hire has all the required licenses the new hire will be sent an email prompting the new hire to under take actions to update information such as employment information so that the regulatory license information will be updated to reflect the new hires new place of employment.

Another new hire process, is the new hire disclosure process 416, and this process can also be initiated upon receipt of an indication that a person has been hired. This process provides for the compliance system sending the new hire employee an email which includes a link to a disclosure interface page which provides a number of information disclosure fields which a new hire must provide information for as part of the disclosure process. Once the disclosure information has been provided through the interface page, the supervisor of new hire and the compliance department can be sent emails indicating that the new hire has provided the disclosure information. In response to an input provided by the supervisor or compliance employee, the compliance system can then retrieve the disclosure information from the compliance database and provide the disclosure information for review through an interface page and a determination is made as to whether further action must be taken.

Another new hire process is the heightened supervision process 418, which requires that a determination be made as to whether there are any facts which require putting the new hire under heightened supervision. When a determination is made that an employee is to be placed under heightened supervisions, this information will be stored in the compliance database, and the compliance engine will indicate in interface pages which show information for the corresponding employee, that the employee is under heightened supervision.

After the new hire regulatory compliance processes have been completed the system will operate to provide an on-going monitor process 420, which can also be referred to as an employee tenure process. The on-going monitor process 420 includes implementing a number of on-going compliance regulatory processes. These on-going processes can provide for utilization of some of the same processes which are used as part of the new hire process 410. For example, the on-going monitor process 420 can include the same criminal review process 412, new registration process 414 and potential heightened supervision process 418 as used in connection with the new hire process. In order to simplify the discussion of various events that can automatically initiate the operation of these various on-going processes table B is provided below.

TABLE B

| Process | Initiating event |
|---|---|
| Criminal Review Process 412 | This process can be initiated by fingerprint records with Criminal Activity within Web CRD, and the Web CRD information is obtained by automatic download from the NASD Web CRD through the compliance system web CRD interface, generally downloads from the NASD Web CRD system will be referred to as a Web CRD report, such as the various reports referred to above in Table A. Process can be initiated during an employee's tenure by the disclosure of a Criminal Event. |
| New Hire Registration 414 | Submission of the electronic compliance U4 Request form for a "New Registration". This may be the initiating event when an employee does not require licenses, but still wishes to be registered. |
| Registration Update 422 | Submission of electronic compliance U4 Request form or automated based on personal details, such as work address or cost center changes within organization. |
| Regulatory Continuing Education (CE) 424 | A continuing education Window is opened in a Web CRD report in response to a submission to the Web CRD |
| License/Exam 426 | An Exam Window is opened by Web CRD report |
| Ad Hoc Disclosures 428 | Employee initiates a new disclosure when a new disclosure or disclosure update is required. |
| Ad Hoc Requests 428 | Employee initiates an ad hoc request for pre-approval of an activity, investment, etc. If approved this will become a disclosable item |
| Annual Disclosures 430 | The employees anniversary hire date, unless the employee has submitted an Ad-Hoc disclosure with two weeks of the employees anniversary. |
| Potential Heightened Supervision 418 | An employee may be considered for Heightened Supervision based on events outside the scope of compliance system, including customer complaints or compliance violations. |
| 3070 Filings (not shown in figures) | A 3070 filing may be initiated by an Employee Disclosure or Criminal History Reviews. |

The initiation events described herein are events which can be received by compliance system, either through automatic entry into to the compliance system, or by a user inputting data into the compliance system through one of the user interface pages described herein, or the events could be events which are downloaded to the compliance system through the operation of the Web CRD, or the events could correspond to information received by the compliance system from one of the other computer systems of the organization. The basic operation of the various operations of the different processes are described in connection with Table C below.

TABLE C

| Process Name | Description |
| --- | --- |
| Criminal Review Process | This process used to conduct a criminal review on an individual to determine if the individual is statutorily disqualified or if the individual needs to be terminated for other reasons or if any filings are required related to the initiating criminal event. |
| New Hire Registration | The New Hire Registration process facilitates the registration of new employees or existing employees who wish to become registered with the Organization. All employees that require licenses to perform their job will be required to participate in this process. |
| Registration Update | The Registration Update process will facilitate updates to an employees registration information, including states, licenses, and disclosures. |
| Regulatory Continuing Education (CE) | The Regulatory CE process provides a mechanism to track regulatory CE for registered organization employees and also provides facilities for CE reminders, Registration Follow up and a Compliance task when CE becomes Inactive. |
| License/Exam | The License Exam process, like the Regulatory CE process, provides the ability to track license exams for employees, including exam reminders and Registration Follow up. |
| Ad Hoc Disclosures | The Ad Hoc disclosures process provides the ability for employees to submit disclosures or disclosure requests at any time. Once disclosures are submitted, they may be reviewed by their supervisor and/or the Compliance Department to determine if any additional actions are required by the employee. |
| Annual Disclosures | The Annual disclosure process facilitates the employees annual disclosure. Once disclosures are submitted, they may be reviewed by their supervisor and the Compliance department to determine if any additional actions are required by the employee. |
| Potential Heightened Supervision | Compliance will assess if the employee will be put on Heightened Supervision. If this is the case, Compliance will enter the effective date of the heightened supervision and attach any policies that need to be followed for the employee. |
| 3070 Filings | Registration will assess any Employee Disclosures or criminal events during a Criminal History Review to determine if a 3070 filing is required. If a filing is required, the filing is performed on the NASD Filing application and the date of the filing is logged in data base of the compliance system. A scanned 3070 filing may also be included in the compliance database. |

When an employee is terminated the process will provide for an employee termination process 434 which provides a number of different regulatory compliance processes. The events which initiate the various termination processes, such as a terminate disclosure process 436, a terminate registration process 438, and a non-registered employee termination process 440 are shown in table D below. Following the termination process, the monitoring and applying different compliance process to the employee who has been terminated ends 442.

TABLE D

| Process Name | Initiating Event |
| --- | --- |
| Terminate Disclosure 436 | HR system provides an indication to the compliance system that an employee has been terminated or that the employee has been placed on salary continuation. |
| Terminate Registration 438 | HR system provides an indication to the compliance system that a registered employee has been terminated or that the employee has been placed on salary continuation. The employee changes legal entities. |
| Non Registered Employee Termination 440 | HR system provides an indication to the compliance system that a non-registered employee has been terminated or that the employee has been placed on salary continuation. |

The terminate disclosures process operates to provide for the termination tasks required to close any open employee disclosures for the terminated employee, which can include the following: unlinking the employees brokerage accounts from treatment as accounts held by an employee of the organization; cancellation of monitoring of employee brokerage accounts. The terminate registration process operates to prompt the completion and filing of an electronic compliance U5 form with the NASD Web CRD system. The non-registered employee termination process provides for performing the tasks required to terminate a non-registered employee, including terminating fingerprints on Web CRD and supporting any 3070 filing required. In connection with the various compliance processes referred to above, the process 400 also includes managing access 444 to the information relating to the different compliance processes. The managing of access can include the monitoring of events and actions in connection with processes being managed using a business processes management module. Different users of the compliance system will be identified upon accessing the compliance system, and will be provided with a corresponding level of access to the compliance information, where the level of access can vary for different users. For example, for a first user of the system who is authorized to search organizational level compliance data, the managing access 444 step could provide the first user with a compliance interface page (discussed in more detail below) which allows the first user to select from a plurality of different compliance processes and to then generate searches on the selected compliance process; whereas other users of the system can be provided with more limited access to compliance information.

In operation the compliance engine 302 will receive identifying information for a user seeking to access the compliance system. Different users seeking access to the compliance system will be provided with different levels of access to the compliance system. For example an employee who is in the compliance department and has a high level responsibility will be provided with a high level of access to the information and functionality of the compliance system. An employee who is not in the compliance department, or who does not have a high level of compliance responsibilities, for example a supervisor of customer representatives, will be provided with a second level of access which allows the supervisor to view compliance regulatory information that corresponds to the supervisor employee, and additionally the supervisor employee can be provided access to some of the compliance regulatory information for the employees that are supervised by the supervisor employee. Another type of employee, for example a customer representative employee who interacts direct with customers of the organization who are buying and selling securities, could be provided with a third level of access to the compliance system which allows the customer representative access to some of the compliance regulatory information which pertains to the customer representative employee. Depending on the users level of access to the compliance system the user can be presented with different interface pages generated by the compliance system.

The operation of the system provides that a user of a client computer such as a branch computer 102, or client computer in the organization's backend systems such as computer 113, can access the compliance system 110 through a network. The user can sign-on to the compliance system 110 directly, or the user's sign-on information can be provided to the compliance system by the sign-on system 321. The compliance system 110 will utilize the user's sign-on information to identify the user, and then having determined the user's identity the compliance system will refer to the compliance database information to determine the level of access which the user will be provided with. The compliance system will generate interface pages which are presented provided to the user's computer, and the user's computer will then present these interface pages on the monitor of the user's computer. As shown in more detail below these interface pages will include links and input fields, and information fields which present the user with regulatory compliance information and allow the user to access different functions of the compliance system. The user's client computer can be a standard PC computer, and the user can view the interface pages on the monitor of the computer, and additionally the user can print out reports and interface pages which are displayed on the monitor.

FIG. 5AA shows a compliance administrator page, which is one example of an interface page, which would be presented to a high level compliance employee in the organization. This page would be presented to a user after the user has input a request to access the compliance system and the user has been identified as high level compliance administrator employee. This interface page includes a tab row 502 which allows a user to select on various tabs using a mouse cursor for example. In response to selecting such a tab a responsive interface page would be presented on the display of the computer being used by the user.

The compliance administrator page also provides a control panel area 504. The control panel area is provided with various icons which allow a user to select of different specific regulatory compliance processes such as registrations processes, background investigations, year end registration, WebEFT to regulatory databases, and criminal investigations. As with the tabs discussed above, these various icons corresponds to links, or software instructions, and when a user selects on the icon, the compliance system will generate a corresponding interface page.

FIG. 5AB shows an interface page which corresponds to a user selecting on the background investigation icon from the control panel area 504. The interface page of FIG. 5AB shows a background investigation search page 503 where the user can input various search information to generate searches on the different background investigations which have been conducted, or which are in the process of being conducted. In response to a search, a search result area 506 is provided which identifies different background investigations which are responsive to the search request. In the search page 503 only one investigation is shown as being responsive to the search, but there could of course be a listing which includes multiple investigations which are responsive to the search inquiry. The user can select on the view/edit icon 508 to select a particular background investigation which has been identified as being responsive to the search criteria. Again note that although only one background investigation is identified in area 506 depending on the search criteria multiple background investigations could be identified as being responsive to a particular search. It should be noted that a wide range of different fields are provided in the interface page 503. For example a user could select to search for background investigations initiated by a particular person, field 505, or initiated during a specified date using data search fields 507. Thus, one can determine workflow and patterns for different background investigations during different time periods.

When a user selects on the view edit icon 508, the compliance system will provide another interface page 509 of FIG. 5AC. Interface page 509 provides information regarding the selected background investigation for a particular person, sometimes referred to as the subject. The information can include information pulled from a regulatory agencies database such as CRD (compliance regulatory database maintained by and for regulatory agencies). The information can also include the subject's credit information, and any court records, criminal history, employment history verification, education verification, and insurance, licenses and certification information for the person. Specific background investigation notes for the individual can also be included. For an ongoing open investigation the person(s) conducting the investigation will also be permitted to update background investigation information in this interface page, and this information will be stored in the compliance database.

The background investigation interface page 509 of FIG. 5AC can also include a tab row 510 which allows a user to select on different soft tabs, corresponding to links of software code, other aspects of information pertaining to the subject. For example interface page 511 of FIG. 5AD illustrates a page which can be displayed when a user selects on the individual information tab 512 in the page 509. The page 511 shows information pertaining to the individual who is the subject of the background investigation. This information can include information such as phone numbers, social security number and a range of other information as shown in interface page 511, and the interface page can include a tab row. The interface page can also include additional information fields which allow the user to access job application information, criminal history, and other information for the subject. For example, the user could select on the view/edit icon 513 to access the job application information for the subject.

A user can select on the review history and notes tab 514 of page 511 for example and in response the compliance system will present the user with a review history and notes interface page (not shown) which can include a range of different information including fields and links which a user can select on to access further information regarding the status of a background investigation.

A user can select on the Docs & Email tab 516 and in response the compliance system can present the user with documents and email interface page 517 of FIG. 5AE. This interface page 517 can provide links which allows the user to access documents and emails which relate to background investigation, and regulatory compliance activities that relate to the subject. The compliance system provides an email generation module which operates to provide a number functions. One function is that the interface pages of the system can provide a send an email tab 515, where a user with an appropriate access level to the compliance system can select on the email tab 515, and in response to this selection the user is presented with an interface email page which allows a user to input email information and send an email to desired email addresses, such emails would be automatically stored in the compliance database, and would be accessible as a document or email through the interface page 517. Additionally the email module of the compliance system can generate automatic emails to facilitate the operation of necessary regulatory compliance activities. For example a newly hired employee could be automatically sent an email which prompts the newly hired employee to input regulatory compliance licensing information through and electronic regulatory compliance form presented in an interface page. These emails and the information input through the form would also be stored in the compliance data base and accessible to an authorized user through the interface pages of the compliance system.

Interface page 518 of FIG. 5AF shows and interface page which could be presented an authorized user in response to selecting on the criminal history process icon of page 501 as shown in FIG. 5AA. The interface page 518 is a criminal history search page where a user can input search parameter to search for different criminal history investigations which are conducted in the criminal history processing. This search interface page 518 operates in a manner similar to the background investigation search page discussed above. In response to running a search, responsive criminal history reviews based on the search inquiries shown in a results area at the bottom of the page 518. The user can select on a view/edit icon 520; in response to the selection the user can be presented with criminal history review interface page 519 of FIG. 5AG which shows information for the corresponding criminal history review and related information. The criminal history review interface page 519 can then provide links which a user can select on to be presented with additional pages showing further details of information related to the criminal history review.

Registration process review page 520 of FIG. 5AH shows an interface page which can be presented to a user selecting the registration processes icon in page 501 of FIG. 5AA. This page can provide search functions and fields which allow for a wide range of different searches on registration processes. For example field 521 corresponds to a pick list where a user can select from a range of different search processes, such as processes related to termination of an employee, 3070 form requirement, regulatory continuing education (CE) process and U4 Amendment processes. As shown the U4 amendment process has been selected. The user can also select on additional search parameters such as initiation date ranges, and an identification of individuals who initiated a process. For regulatory compliance activities which are responsive to the search request, view/edit icons can be listed in a responsive results area which shows responses to the search parameter.

Referring back to interface page 501 a user could select on the search tab in the tab row 502. In response to this selection the compliance system can present the user with a search interface page 522 of FIG. 5AI. The search interface page 522 allows a user to search on the compliance database without a limitation to searching on data associated with a particular compliance process. As with the previously discussed search interface pages the results of input search parameters can be displayed in a results area of the interface page 522. A user could then select on a view/edit icon and review interface pages presenting information for records which are responsive to the search parameters. Interface page 523 of FIG. 5AJ shows a profile page for a record which was selected on following a search. This page 523 shows detailed information for an individual such as identification of licenses and registrations held by the individual. Licenses in the discussion herein includes various regulatory compliance registration licenses such as series 7, series 26, series 27 etc. The profile page can also include links or soft tabs which allow a user to access various regulatory compliance records and information for an individual. It should be noted that in one embodiment for any person who is under heightened supervision the text "HEIGHTENED SUPERVISION" will be shown under the persons name in the various interface pages which shows the person's name. If the person shown in the interface page 523, for example, were under heightened supervision and the user selected the heightened supervision tab 524 then the compliance system can provide the user with a heightened supervision interface page 525 as shown in FIG. 5AK. The heightened supervision interface page 525 includes information and links which allow a user to review the reasons for an employee being on heightened supervision.

Interface page 526 of FIG. 5AL can be provided to a user in response to a user selecting on the Review History & Notes tab 527. The interface page 526 can include information showing different events and timing of such events in connection with regulatory compliance and background investigation activities done in connection with an employee. The interface page can be provided with links which a user can select on to obtain additional related information. Interface page 529 of FIG. 5AM can be presented to a user in response to a user selecting on a Documents & E-mail tab 528. The interface page 529 of FIG. 5AM can provide a listing of various regulatory and compliance documents pertaining to an individual, and allow a user to select on a link to view desired document. The compliance database can store images of the various different documents, reports, and communications which are part of the compliance processes. The interface page 529 can also show a listing of various emails and notifications generated by the system. For example, area 530 of the page 529 corresponds to a notification generated by the compliance system which indicates that an employees request for a particular registration has been approved. The user can select on the view/edit icon 531 to retrieve more information regarding the registration approval.

Interface page 532 of FIG. 5AN shows a page which a compliance administrator could access under the search tab 533. Under the search tab the user can select on the employee U4 update page, and in response to this selection the compliance system can present the user with the interface page 532. This U4 update page can be generated to present the user with a form with a range of different U4 registration information for an employee. This information can include a listing of compliance regulatory licenses held by an employee and an identification of which states an employee is registered in.

Referring back to the discussion above regarding different levels of access to the compliance system, it is noted that the tab row of page 532 provides for a wide range of different tabs which the user can select. This wide range of tabs is typical for the range of selections which would be presented in an interface page to a high level compliance administrative employee. An employee who is a direct supervisor of customer representatives would in one embodiment of the invention be provided with more restrictive level of access to the system. For example in one embodiment supervisor would be present with an initial interface page upon accessing the system which would allow the user to select from a limited number of tabs to access additional information. In one embodiment for example an employee supervisor would be presented with the soft tabs of "My Employees", "My Tasks", "My profile" and "My U4 Update". In response to selecting on the My Employees the compliance system would present the user with a listing of employees supervised by the user, and regulatory compliance information relating to the employees. This employee information can include the name, corresponding compliance tasks and due dates for each of the employees supervised by the supervisor.

Interface page 534 of FIG. 5AO shows a my tasks interface page which could be presented to a user in response to the user selecting on the my tasks tab 535. If the user had any outstanding regulatory compliance tasks such as for example filling our annual disclosure forms, or need to register for a new regulatory compliance license for example these task could be shown in the My tasks page 534. Additionally, if the user is a supervisor of other employees, then the my tasks page could also include actions which the user must take such as reviewing and approving the regulatory compliance information and requests submitted by employees which the user supervisors.

The various interface pages discussed herein provide a mechanism where information contained in the compliance database can be presented to the user of the compliance system. Additionally, the interface pages provide a page where a user can input compliance information and requests into the compliance system, which will stored the input information in the compliance database, and process the input information and requests, to initiate different compliance processes and provide different notifications to users of the compliance system as part of the different compliance processes.

Page 536 of FIG. 5AP shows an interface page which can be presented by the compliance system in response to a user selecting on the My Employees tab 537. The my employees interface page 536 could show a listing of employees supervised by the user, open tasks that need to be completed by the user, due dates for each of the tasks and an indication of whether the corresponding employee is a registered employee.

Page 537 of FIG. 5AQ shows an interface page which corresponds to the registration snapshot tab 538. This page can show the status of an employee's regulatory compliances licenses, the states in which an employee is licensed and the date on which the employee has attended an annual compliance meeting, and the date by which the employee must attend their next annual compliance meeting.

Page 539 of FIG. 5AR shows an interface page which corresponds to the My profile tab 540. This page can show the user his or her own profile information, including regulatory and compliance information, regulatory continuing education (CE) information and so forth.

Page 541 of FIG. 5AS shows and interface page which corresponds to the My U4 Update tab 542. This page presents and electronic regulatory compliance form, and can include a range of disclosure fields, and/or be linked to additional disclosure forms. This page can present the user with fields which a user can select if they wish to sign up to take additional exams for additional licenses. The user can also select or deselect states in which they wish to be registered. The My U4 update interface page can include additional information which is not shown in the embodiment of page 541. This additional information would be information which is provided for in many standard U4 forms such as providing an indication of whether the information being provided in the U4 Form relates to an outside business, a customer complaint or litigation, a regulatory action, a bankruptcy, a criminal action etc. Employees can make requests to do U4 amendments, where they will update there regulatory compliance information with the NASD, by input such changes into the page 541. The inputting of selections to change license states, or to obtain new licenses, or to change other U4 form regulatory compliance information is received by the compliance system and the compliance system will then operate to automatically initiate a registration process. The registration process, which includes processing U4 amendment requests, will generally, in response to employee input requests, at a minimum include the employee's supervisor being provided with interface pages which prompt the supervisor to approve or disapprove of the requested u4 amendment, where such requests can include obtaining new licenses, or changing states of registration license. Additional details regarding this operation are discussed below.

Page 592 of FIG. 5AT shows and interface page which corresponds to the Initiate Process tab 543. In one embodiment of the system and method herein the compliance system will operate to automatically initiate most regulatory compliance processes (e.g. in response to an initiating event), however, there can be some instances when a user will wish to manually initiate process.

Page 544 of FIG. 5AU shows an interface page which can be presented to a user in response to the user selecting the Admin tab 545, and then under the Admin tab, selecting the User Admin tab 546. This User Admin page 544 has a column 547 which identifies employees which are provided with different levels of access to the system, where the different levels of access are specified in the Role column 549, and the users general type of position in the organization is specified in the Contact Type column 550.

Page 551 of FIG. 5AV shows an interface page which can be presented to a user in response to a selection of the pick lists tab 552. This picklists interface tab allows a user, which will typically be compliance administrator type of employee user, to specify different picklists which can be provided for in use in connection with various data input fields of different interface pages of the system.

Page 553 of FIG. 5AW shows and interface page which corresponds to selection of the Compliance Role tab 554. This Compliance Role interface page 553 identifies different compliance roles in the organization and the corresponding licenses which are required for the different roles in the organization. A user can select on the corresponding view/edit icon to edit changes in the various compliance roles and license requirements, and the date of such modifications can also be shown in the compliance interface page 553.

Page 555 of FIG. 5AX shows and interface page which corresponds to selection of a Jurisdiction Maintenance tab 556. This page 556 can display the various registrations fees associated with maintaining different licenses in different jurisdictions or states. It should be noted that this page as with many of the pages described above can allow the user to modify and edit information various fields of the compliance database, and this new information will then be presented when the page is subsequently generated in response to a user selection of the corresponding tab.

Page 557 of FIG. 5AY shows and interface page which corresponds to selection of a Job Code tab 558. This Job Code interface page 557 allows a user to input job codes in a job code field, and to provide a description for the job code. Additionally the job code interface page 557 provides a field where a user can select a corresponding compliance role for a given job code. In one embodiment of the system and method herein when a user initially enters information for a newly hired person they will be required to select a job code for the new hire. This job code will then correspond to compliance role in the organization, and the compliance role will have a corresponding set of regulatory compliance licenses. This set of required licenses will be compared against those actually held by the new hire, and one or more emails or other notifications can be automatically generated and sent to the employee, and potentially the employees supervisor, to alert the employee as to next steps which must be taken to either obtain or maintain the necessary licenses.

Page 559 of FIG. 5AZ shows an interface page which corresponds to user having selected on the WebEFT icon of FIG. 5AA. This page allows a user to access information, and search information for different WebEFT filings with the NASD WebCRD system. Page 560 of FIG. 5BA is an interface page which allows a user to review information logs which shows records of various filing and reports from the NASD WebCRD system.

Page 561 of FIG. 5BB shows a page which could be presented to an administrative compliance employee in response to selecting on a link to the year end registration process, as shown in page 501 of FIG. 5AA. The page 561 provides a send notification button 562 where a user can select the send notification button which will cause the compliance system to send a notification to supervisors of the licensed employees to review license information for supervised employees and make selections as to which states the licensed employees should be registered in. A supervisor would access a year end update interface page such as 563 shown in FIG. 5BC, and provide inputs through the various selection fields of page 563 to either add or delete states in which the employee is licensed. The supervisor's inputs are stored in the compliance database. FIG. 5BD shows the a second portion of the supervisor year end registration interface page 563. The interface page 563 include a cost summary area 564 which shows the total cost of the license registrations for each employee supervised by the supervisor. The supervisor can make changes in the requested state registration the different supervised employees, and these changes will be saved to the compliance system and the compliance system will operate to calculate the total license renewal cost, and present this information renewal cost area.

Interface page 565 of FIG. 5BE shows a general search page corresponding to the interface search page 522 shown in FIG. 5AI. However, page 565 shows advanced search options, corresponding to the selection of the Advanced Search field 566. The advanced search options allow a user to select on searches relating to employees hold different specific regulatory licenses for example.

Interface page 567 of FIG. 5BF shows a page which corresponds to the previously discussed page 544 of FIG. 5AU. However page 567 is provided showing a view where the user has accessed edit fields and is provided with a data input and review area 568 where a user is presented with different data entry and selection fields where a user can input information specifying an employees compliance role, and determining a given employees access right to the information contained in the compliance system database. For each employee in the organization, the compliance database will contain an employee record, and the employee record will specify the employees access rights to the to the compliance system.

Interface page 569 of FIG. 5BG corresponds to selection the Job Code tab 570. The job code interface page 569 provides for display of a job code and a corresponding job description. This page 569 is the same as page 557 of FIG. 5AY but page 569 is shown with information populating the different data fields. A picklist field 571 is provided where a particular job code, shown in the job code field 572 is then mapped to a corresponding compliance role. Once the user has input the appropriate compliance role for a given job code, the information is saved in the compliance database and is used to make determinations as to whether employees with a given job code have obtained and maintained necessary compliance licenses as determined by the employees determined compliance role.

Figure 8:
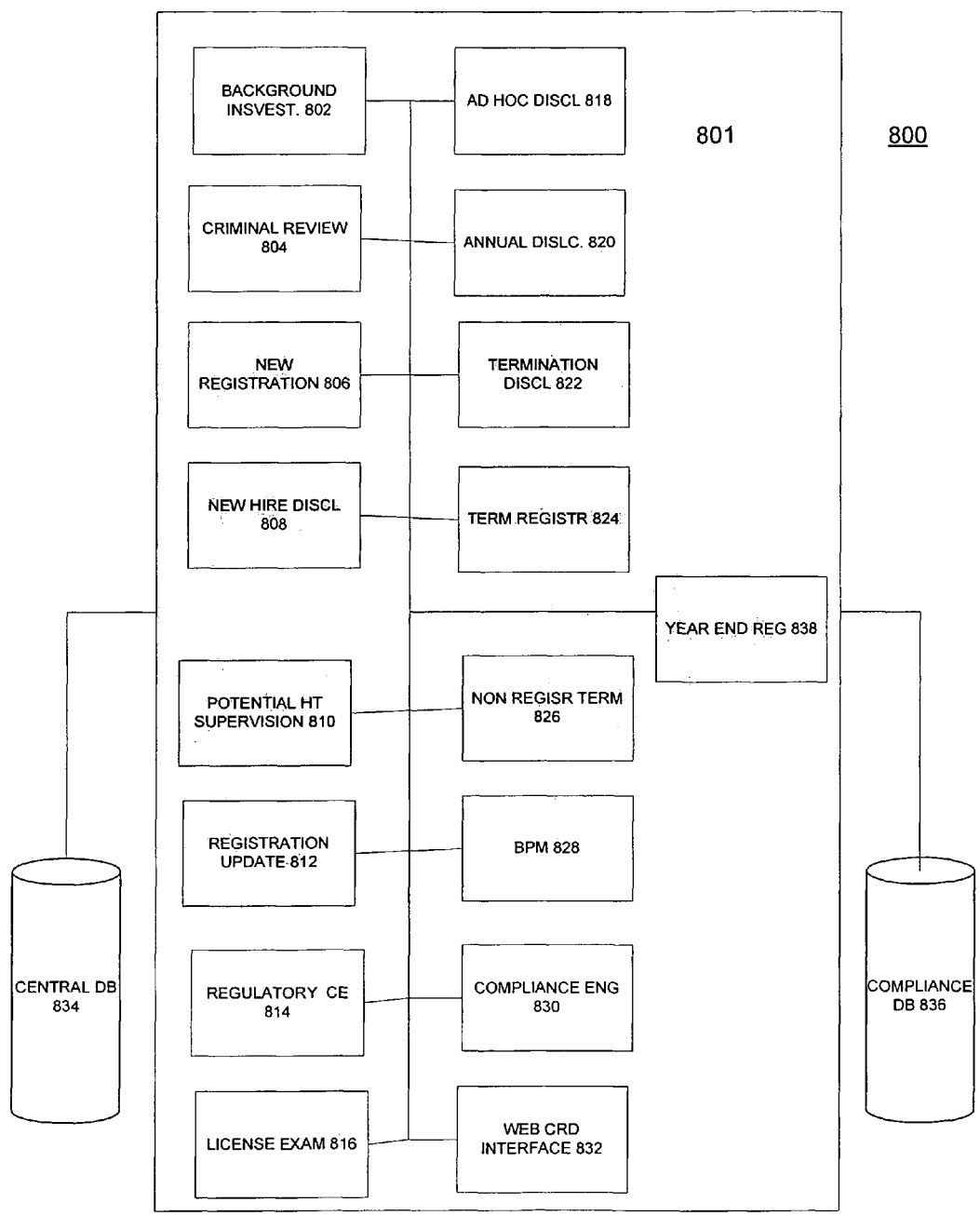
FIG. 8 illustrates an embodiment of different modules of a compliance system of the present invention.

FIG. 8 shows an embodiment 800 of a compliance system of the system of the present invention. The embodiment 800 includes a compliance computer system 801. The computer system 801 can be a server computer, mainframe computer or personal computer, and generally such a computer system will include the basic elements of computer system as described in connection with FIG. 2 above. The compliance computer system could be implemented in a number of separate computers or processors which are networked together to operate cooperatively. The processor of the compliance computer system can include a number of software modules which operate to program the processor to perform the regulatory compliance processes described herein. In one embodiment the processor of the compliance system will be provided with a background investigation module 802, which operates to provide for the processes of the background investigation for a prospective new hire employee. The criminal review module 804 will operate to provide for the process of the criminal review operations. The New Hire registration module 806 provides instructions to the processor which causes it to provide for the operation of the new registration process. The New Hire disclosure module 808 operates to provide for the process of the new hire disclosure process. The Potential Heightened supervision module operates to provide for the heightened supervision process. The Registration update module 812 operates to provide for the registration process. The Regulatory continuing education module 814 operates to provide for the registration continuing education process. The licensing exam module 816 operates to provide for the licensing exam process. The ad hoc disclosure module 818 operates to provide for the ad hoc disclosure process. The annual disclosure module 820 operates to provide for the annual disclosure process. The termination disclosure module 822 operates to provide for the termination disclosure process. The termination registration module 824 operates to provide for the termination registration process. The non-registered termination module 826 operates to provide for the non-registered termination process, where this process provides for terminating the association of the terminated employees fingerprint information with the organization.

The business process module (BPM) 828 operates to track the operation the different processes, and to provide for implementation of specific business rules in conjunction with the various regulatory compliance process. In one embodiment certain services which are utilized in a plurality of different regulatory compliance process and modules can be provided for in the BPM module 828 and the different regulatory compliance modules can access and utilize different services and operations provided for by the BPM module 828. The compliance engine 830 operates in conjunction with the BPM 828 to identify different users accessing the compliance system 800 and to determine a particular users level of access to the system. The compliance engine 830 will operate to monitor changes and additions to the data stored in the central database 834 and to identify different initiating events which trigger the operation of the different compliance regulatory processes provided for by the different regulatory compliance modules shown in FIG. 8. The compliance engine 830 will also operate to receive the different Web CRD reports and to identify initiating events. The compliance engine will also operate to identify different user inputs to the compliance system and to provide information to the BPM, so that the BPM can track and provide for operations of the compliance system. The Web CRD interface module 832 operates to transfer information between the compliance system and the NASD Web CRD system. The compliance database 836 will store regulatory compliance information which is used and tracked by the compliance system.

The Year End Registration module 838 operates to provide for the year end registration process, described in more detail below.

Figure 9A:
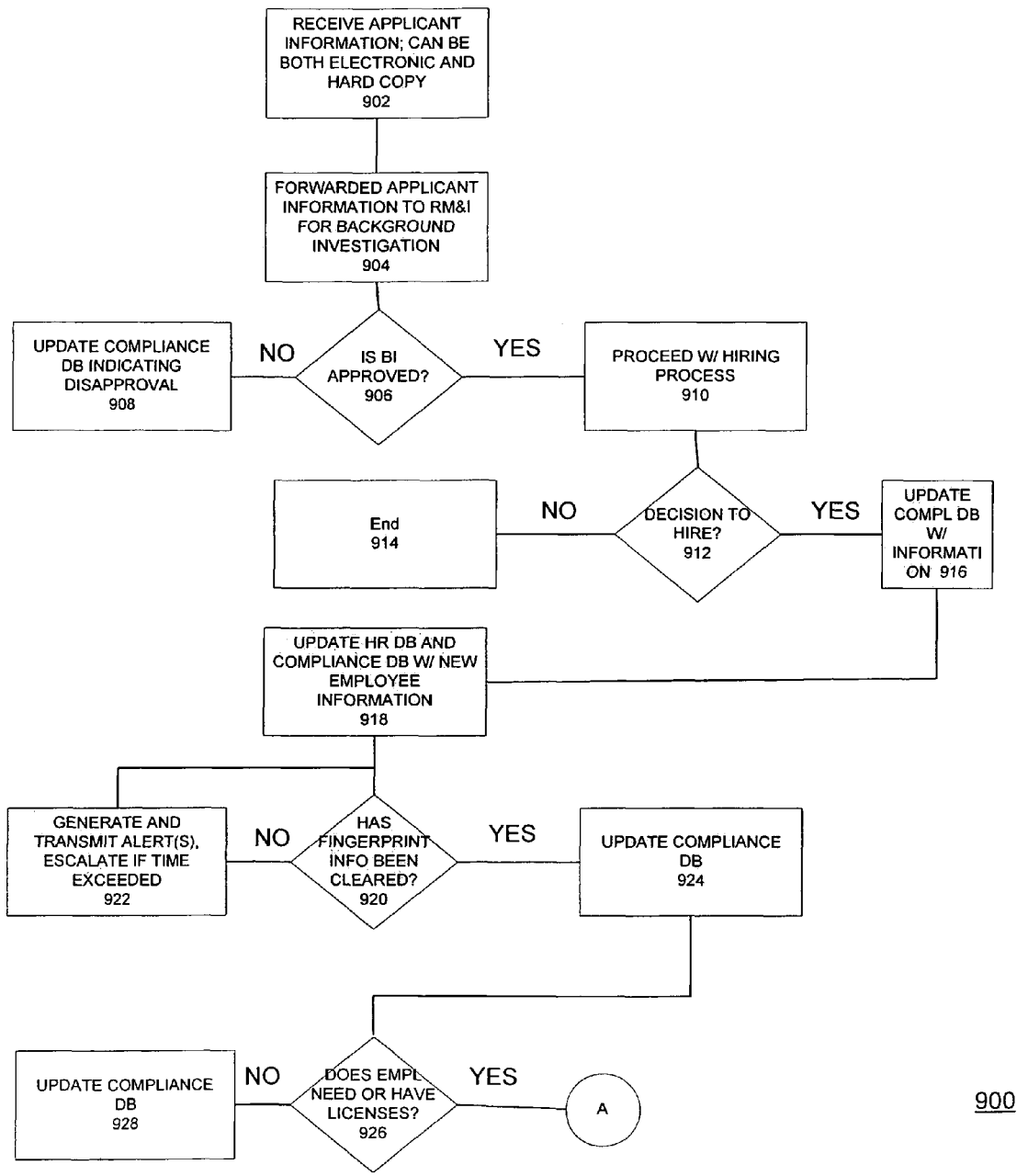
FIGS. 9A-9C illustrate a process flow chart of a method of an embodiment of the present invention.
Figure 9B:
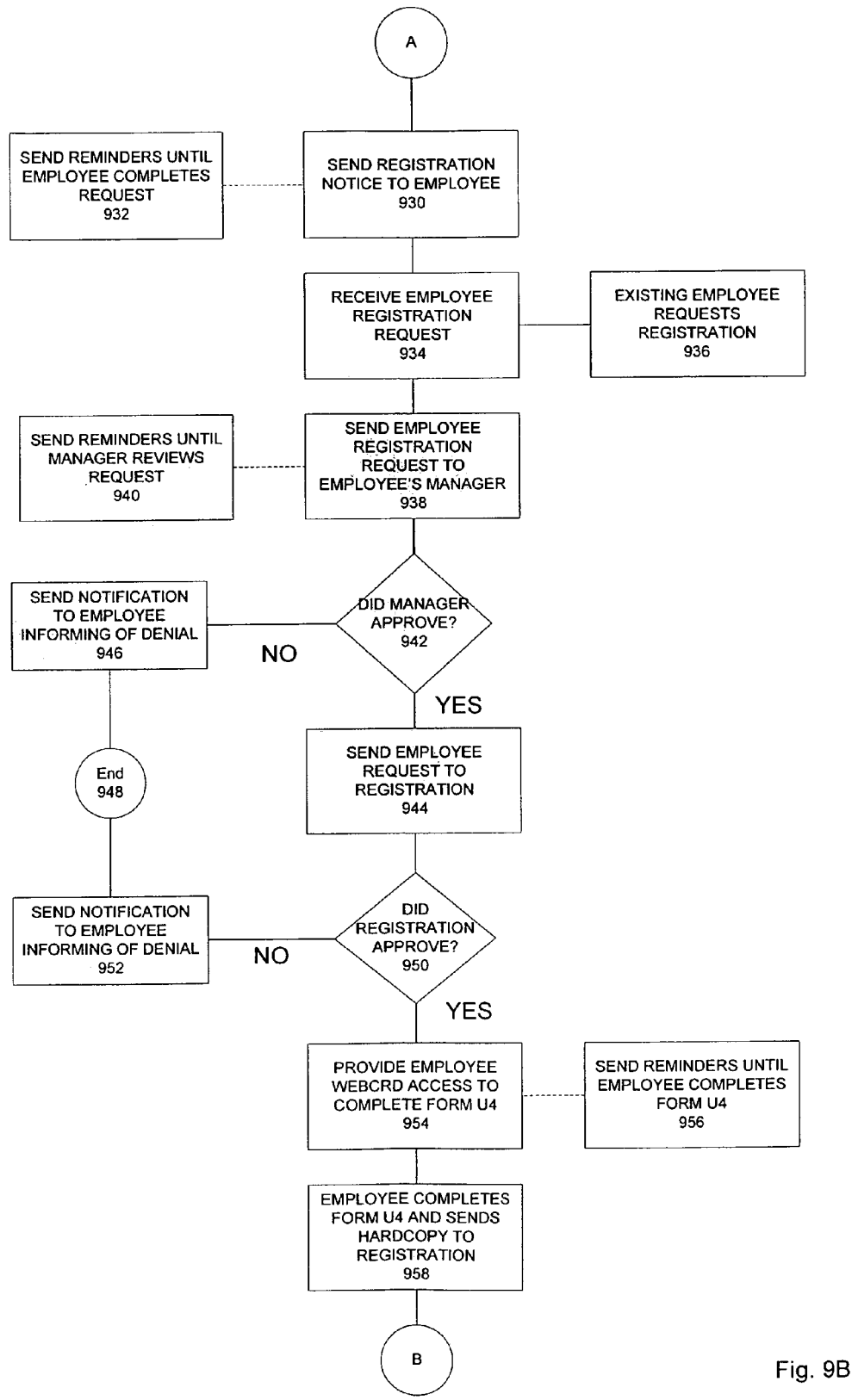
Figure 9C:
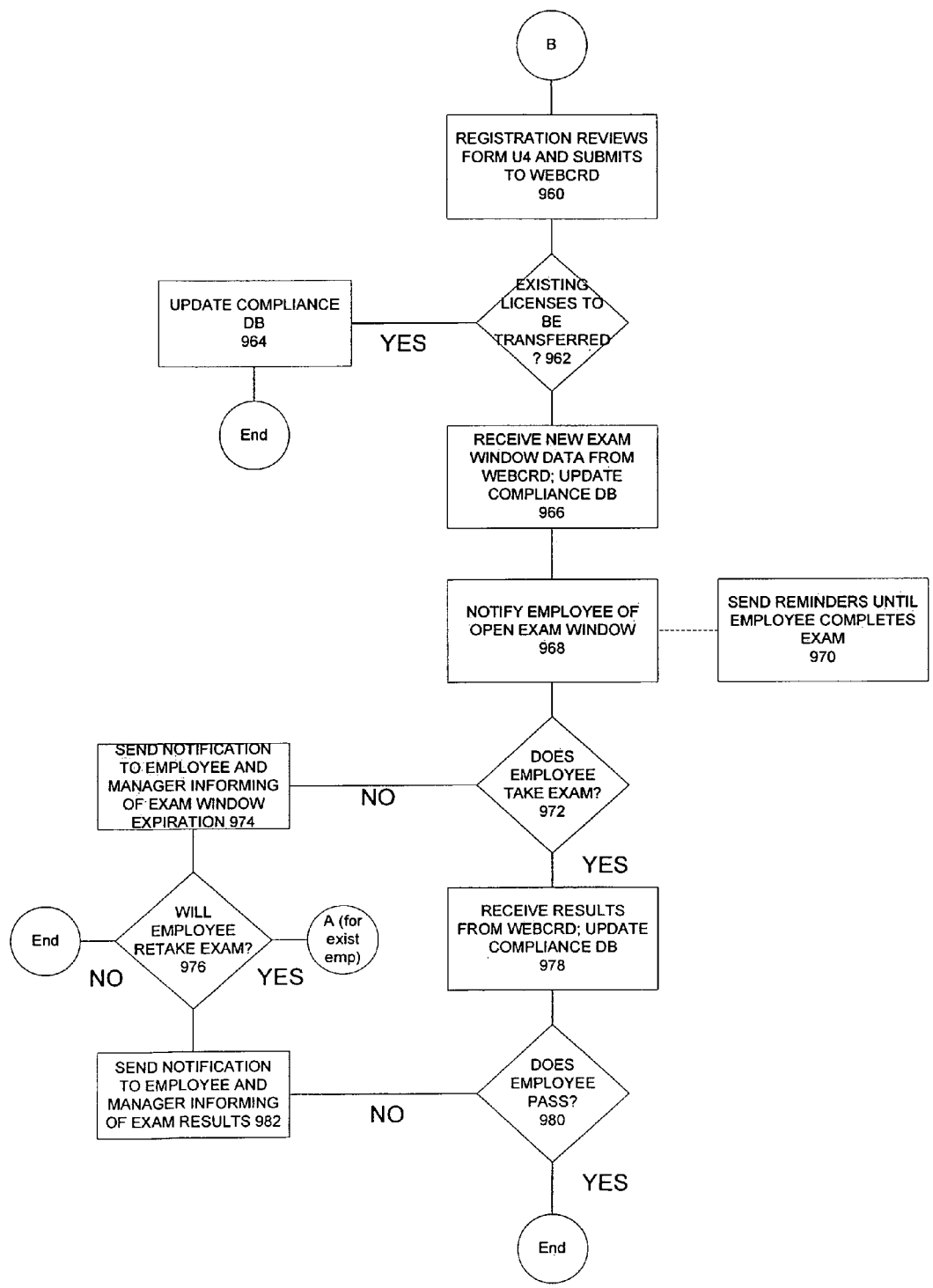

FIGS. 9A-9C illustrate an embodiment of a method 900 of the present invention. This method can be a computer implemented method using the compliance computer system described above which could include the different software modules described above. In addition it should be recognized that the various different steps performed in the different processes described herein can include receiving information from different users, where this information can be input by the different users through different user interface pages as described above. The information input through these different interface pages is received by the compliance system and stored in the compliance database. Different users can access the compliance system and through the different interface pages perform searches and review information, to determine the status with regard to the various different process herein.

The method of 900 illustrates aspects of an embodiment of the registration process relating to both existing and new hire employees of the organization. For a new hire employee the registration process is preceded by some initial steps prior to beginning the registration process. Initially the HR system will receive the applicant information 902. The applicant information can be received either by an electronic form filled out by the applicant or another person, or the applicant information can be received via hard copy and the information can then be scanned into, or manually entered, into the HR system, such that the information is stored in an HR database. The applicant's application information is then copied to a central database where the compliance system, and specifically the background investigation module 802 will respond to the new applicant information by initiating the background investigation process. Additionally, the new applicant information can be stored in the compliance system database. The initiation of the background investigation process can include forwarding, or sending, 904 an email to the personnel in the risk management and investigation group of the organization, and this email can include the new applicant information, or it can include a link, where a user can select on the link in the email and access the background investigation information through the various compliance system interface pages as described above. The RM&I group will perform the background investigation, which can include populating the various input fields of different background investigation interface pages, and a determination is made as to whether the applicant's background investigation is approved 906. If the background investigation results in disapproval of the applicant, then the compliance database is updated 908 to reflect the disapproval of the applicant based on the background investigation. If the applicant is approved then the hiring process proceeds 910. Based on the hiring process, including various interviews with the applicant by employees of the organization, the organization, specifically individuals in the organization will then make a decision 912 as to whether to hire the application. If the applicant is not hired then the process is ended 914. At the ending of the process at 914, the compliance database, and the HR database could be updated to indicate the reason for the decision not to hire. If the applicant is hired then the compliance database and the HR database will be updated 916 to indicate that the person was hired.

In addition to indicating that a person has been hired, in some instances it will be necessary to input further information in the HR database and the compliance database upon making the decision to hire a person. For example, in some instances the person being hired will have potentially a number of different regulatory licenses which are required for performing various different roles in connection with providing services in the financial services industry. For example different series compliance licenses are discussed above in connection with the different compliance system interface pages. This additional regulatory license information and potentially other employee information will be used to update 918 the HR database and the compliance database after updating the databases to indicate that a decision has been made to hire the person. The information for the new hire will also include a job code identifier which is determined based on the person's job description.

In addition to the updating of the databases with the above information, once a decision to hire has been made, and the new person has joined the organization as an employee, the new employee will be fingerprinted. The finger print information will be uploaded by the compliance system to the NASD WebCRD system. As part of the downloading of reports from the NASD WebCRD system, in the normal course a report will be received from the NASD Web CRD system indicating the fingerprint information has been cleared by the NASD. The compliance system will review the reports obtained from the NASD to determine 920 the fingerprint information has been cleared.

If the fingerprint clearance report has not been received within an predetermined amount of time the compliance system will generate 922 an alert indicating that the new employee's fingerprint information has not been obtained, or cleared, in the predetermined amount of time. This alert can be provided by email to an appropriate person in the organization, and or, additionally, the alert can be shown in a My Task interface page for a person who is assigned with escalating a situation when a fingerprint clearance report has not been received within a predetermined amount of time. The system herein can provide for a number of different ways of providing alerts or notices. Subsequently, the compliance system will again determine if a clearance report has been received. After such a report has been received the compliance system will automatically update 924 the compliance database indicating that the fingerprint clearance report has been received.

The process also provides for determining 926 if new hire has regulatory compliance licenses, and if the person's job position requires that the person have regulatory compliance licenses. The determination of what licenses are required for a persons job is discussed in more detail herein, but generally this determination is made by using system defined job codes which are mapped to compliance roles in the organization, and the compliance roles in the organization are mapped to required licenses for the different compliance roles. If the person's job code does not correspond to a compliance role that requires regulatory licenses and the person does not have any regulatory licenses then the compliance database is updated 928 to indicate this.

If the person has regulatory licenses, or the person is required to obtain new or additional licenses, then a registration notice is sent 930 to the new employee. The registration notice can be in the form of an email which provides a software link and in response to the new employee clicking on the link they are presented with a compliance system interface page which prompts the new employee to input new or updated registration information, which operates as an indication that the new employee is requesting access to an interface page to make a U4 amendment indicating that they need to acquire new or additional regulatory license(s), or possibly transfer an existing license(s). If the employee does not respond to the notice by providing the necessary information for addressing the needed licensing requirements, then the employee will be sent 932 reminders until they respond with the necessary information, and ultimately after a predetermined amount of time the employee's lack of response can be escalated to the employee's supervisor. Once the employee input registration request information has been received 934 the information can be stored in the compliance database. The information provided by the employee can be in the form of a request, such as the employee is requesting that their license employment information should be updated from an old employer to the new employer, or the person is requesting authorization to undertake the necessary requirements such as testing to receive one or more new regulatory licenses. The page 541 of FIG. 5AS illustrates an interface page that an employee could use to input regulatory compliance information corresponding to a request to make a U4 amendment, such as a request to change a registration license state, or obtain a new registration license. Thus, through a page like page 541 an employee can input a request to amend the regulatory and compliance information that applies to the employee.

The registration process 900 also provides for providing existing employees who wish to obtain new licenses access to interface pages which allow existing employees to request 936 obtaining new licenses. Once the registration request information has been received a notice is sent 938 to the employee's supervisor. This notice can take different forms such as an email with a link to an interface page, and/or the supervisor could be provided with a notice under the supervisor's My Task interface page which indicates that the supervisor has a task of approving his or her employee's registration update request. If the supervisor does not respond to the employee's request for registration information within a predetermined time period then reminders can be sent 940 to the supervisor, and if necessary the event can be escalated. A supervisor's input of approval or denial is stored in the compliance database. A determination 942 is made by the compliance system as to whether the supervisor has approved the registration request. If the supervisor approves the registration request then the request is forwarded 944 to the organization's compliance department via the compliance system. If the supervisor denies the request then the employee is so notified 946 and the process is terminated. The registration department's decision regarding the request is entered to the compliance system through an interface page and compliance database is update. A determination 950 is made as to the registration department's decision. If the registration department denies the registration request then the employee is notified 952 and the process is ended 948. It should be noted that reference herein is made to a registration department, and other departments within the organization such as a compliance department and so forth . . . . As one of skill in the art will recognize different organizations can structure different groups or departments in the organization in various different ways, thus reference to either a registration employee or a compliance employee should not be view as excluding an employee who is in a different department in the organization, where the employee is performing the particular role which is described.

If the registration department approves the registration requests, then the employee is notified and provided 954 with access to the NASD WebCRD system to input the requested information into the NASD WebCRD system. In one embodiment the when the employee is a new employee, or an existing employee who has not previously held a regulatory license, meaning the employee is not a registered employee, the compliance system will, after the registration department has approved the employee request, generate an email providing a reference number to the employee, and providing instructions for the filling out the information for the electronic U4 form; the email can also include a link where the user can select on the link and the users computer will be connected to the NASD WebCRD system, such that the users computer will communicate with the NASD WebCRD system, and the reference number is used to track the information input by the employee. FIGS. 6A-C illustrate views 600, 602 and 604 of an embodiment of an email which can be sent to an employee to provide a reference number and instructions for the employee to fill out an electronic U4 form on the NASD WebCRD system, and to provide for submission of the electronic U4 form information input by the employee to the organizations compliance system.

The compliance system can monitor whether and when the employee completes the U4 form via the reports or other communications from the NASD WebCRD system, and send 956 reminders to the employee of the need to complete the electronic U4 form on the NASD WebCRD system. Once the employee has accessed the appropriate interface page and filled out the U4 form with the information; for example information indicating new regulatory license(s) which the employee would like to obtain. The employee can be prompted to print out the completed U4 form and sign it and send 958 it to the registration department organization. It should be noted that each of the various computer systems described above could be connected to printers which allow the users of the compliance system to print out the various interface pages, and search result reports which the compliance system generates Via interface pages, or by hard copy print out of the U4 form signed by the employee requesting the U4 amendment, the appropriate employees of the organization will review the U4 amendment information input by the employee, and if the U4 amendment information provided in the U4 form is determined to be complete, then the reviewing employee can input an indication through an interface page of the compliance system that the information provided in the U4 form is complete, and the compliance system will submit 960, or otherwise indicate, that the information input by the employee in the U4 form is ready for processing. Typically, the submitting will be a communication from the compliance system to the NASD WebCRD system indicating that the organization authorizing the processing the information which employee has already input to the NASD WebCRD system. It should also be noted that while much of the discussion herein refers to the communication of information with the NASD WebCRD system, it is possible NASD WebCRD system could be supplemented with additional regulatory entity computer systems. Thus the references herein to the NASD WebCRD system are utilized to illustrate the present embodiment, but it should be recognized that in fact the NASD WebCRD system is computer system managed by a regulatory agency which is used for purposes of tracking regulatory compliance information. Thus, as used herein the term NASD WebCRD system should be interpreted to broadly include regulatory agency computer system which is used for purposes of tracking regulatory compliance information.

It should be noted that specific aspects of providing the U4 amendments to the NASD WebCRD could be implemented in different ways. For example, in one embodiment the employee could be provided with a link and a reference number in an email which allows an employee to directly access an electronic U4 form on the NASD WebCRD system, and the employee could input the information directly into the U4 form via an interface page presenting the U4 form. In this situation which could be used for a new employee, or an existing employee who wishes to obtain a license and become a registered employee, the NASD WebCRD system would operate to hold the U4 amendment information input by the new employee as pending, and then upon receiving an approval of submission 960 from the organization's compliance system the NASD WebCRD system would then proceed to process the U4 amendment information submitted by the new employee.

In another scenario where an employee who is an existing registered employee inputs an indication through an interface page, such as page 541 of Fig. AS, that they would like to obtain a registration in additional state, the supervisor of the employee could approve the addition of the new state registration by inputting an approval through an interface page. Upon receiving this approval, the compliance system would then operate to automatically submit this additional state registration request as a U4 amendment for the employee to the NASD WebCRD system. In another situation where an existing registered employee seeks to obtain a new series license, then the employee could input a request to obtain a new series license through an interface page, such as page 541 of FIG. 5AS. Following this input requesting a new series license, the supervisor and an employee from the registration department of the organization would both need in input approvals to the compliance system, and after receipt of the approvals the compliance system would operate to automatically input the request by the employee to obtain the new series license to the NASD WebCRD system.

If the U4 form information includes requests that existing licenses be transferred so as to indicate an employees new place of employment, then upon receipt of WebCRD report from NASD that license information has been updated to transfer 962, the compliance database will be updated 964 to indicate that the transfer information of the licenses held by the employee has been updated by the NASD. If the U4 form information includes more than a request of transfer of license information, such as including a request for new licenses, then a WebCRD report from NASD should also include an identification of exam windows for the employee. The compliance system will review the time periods, exam windows, for the employee to take the exam(s) for the requested licenses, and update 966 the compliance database so that the employees My Tasks interface page will provide access to the exam window time periods. The My tasks interface page can provide notice 968 to the employee of the exam window, and additionally notification can be provided by sending e-mails to the employee of the exam window. As the time period for taking the exam becomes shorter, the compliance system can send 970 reminder emails to the employee. After a predetermined amount of time, the compliance system will determine 972 if the employee has take the exam. If the employee does not take the exam, during the exam period, then compliance system will notify 974 the supervisor of the employee, and a determination 976 is made as to whether the employee will resubmit a request for obtaining the exam to obtain the license. If the employee is to resubmit a request then the process for submitting a request to obtain a license is repeated.

After the employee takes the exam a WebCRD report will be received 978. A determination 980 of the exam report is made. If the employee passes the exam then the compliance database is updated to indicate the new license; if the employee fails the exam then the compliance databases is update to indicate the failure. The employee and the supervisor are then provided 982 with a notification of the exam results.

In the discussion herein references are made to sending emails, or providing notification, or alerts in response to particular events, or in response to making determinations regarding actions which need to be taken by different employees of the organization. In general any of these different communications could be provided to an employee via a number of different communication channels. In broad terms these communications can be referred to as notifications. Instead of sending an email, or in addition to sending an email, the compliance system could operate to provide a notification to a person that some action needs to be taken, by providing an entry in a my task page for an employee that needs to take some action with respect to a compliance process. Additionally, an email could be sent to the employee providing the email with text which alerts the employee to the task, or provides some notice that a particular event has occurred. The compliance database can store a number of different form text communications, which are provided to employees in response to particular events, where different events correspond to different text messages which communicate information about the particular type of event that has occurred. These text messages could be provided as emails, or notices which are provided in the interface pages for an employee.

Figure 10:
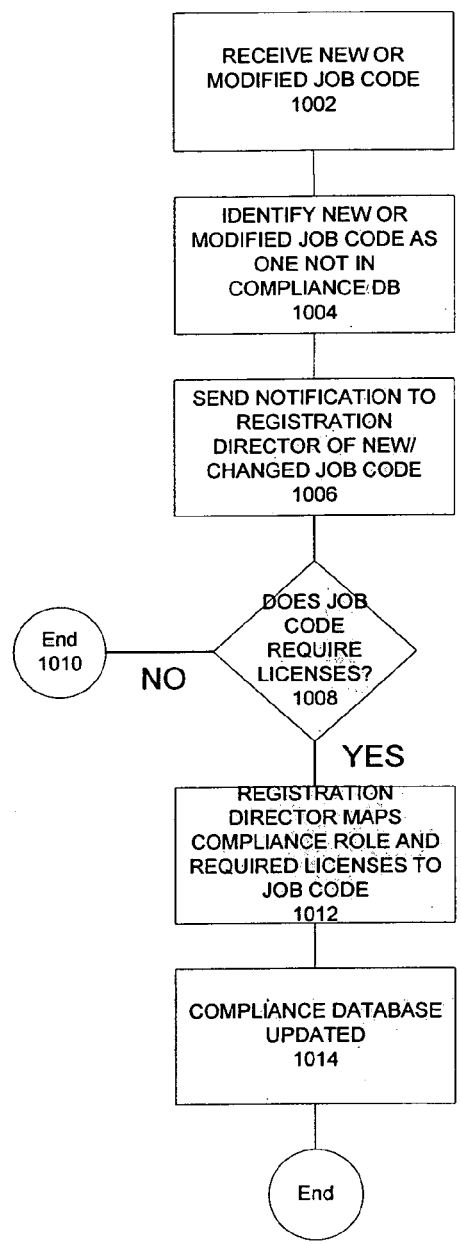
FIG. 10 illustrates a process flow chart of a job code registration process of an embodiment of the present invention.

FIG. 10 shows a method 1000 of an embodiment of the invention herein. Specifically, the method shows a process which is implemented by the compliance system, where a processor of the compliance system is programmed to implement the process. Initially a new Job Code is received 1002 by the compliance system, or rather than a new job code, the compliance system could receive a notification that a description for a job corresponding to a given job code has changed. The new job code can be provided by a HR employee entering a new job code into the HR system, this new job code would then be forwarded to the central database where the compliance system retrieve the new job code, or revised job description for an existing job code. The compliance system would then identify 1004 the new job code, or new job description, as one which does not already exist in the compliance database. Having determined that a new job code has been received, the compliance system will provide a notification 1006 to an employee in the organizations compliance department, in one case this could be a person tasked with acting as a registration director for new or changed job codes. This notification could be provided as an email, and/or as a notice which is provided through an interface page of the compliance system. After receiving notice of the new or changed job code, the registration director will review the details of the new job code through a compliance system interface page. Based on the job description for the corresponding job code, the registration director will make a determination 1008 as to whether the new job code with its corresponding job description requires one or more regulatory licenses. If the job code does not require any regulatory licenses, then the process ends 1010, and the compliance database can be updated to reflect that the new job code does not require any regulatory compliance licenses. If a determination is made that the job code, and its corresponding job responsibilities does require that the employee have one or more compliance licenses, then an appropriate compliance role is mapped, or correlated, 1012 to the new or modified job code. The compliance database will contain a plurality of different compliance roles within the organization, and each of the different compliance roles will be provided with, or mapped to the corresponding set of regulatory compliance licenses which are required for the given compliance role. FIG. 5AW discussed above shows an interface page 553 of the compliance system which could be accessed by an authorized employee in the organizations registration, or compliance department. The interface page identifies different compliance roles in the organization and then shows different regulatory compliance licenses which are mapped to the compliance role in the compliance database. One advantage of this approach of mapping job codes to compliance roles, and compliance roles to regulatory compliance licenses, is that the personnel in the HR department who make determinations as to job codes for employees, will generally be knowledgeable as to different job titles, and job responsibilities, but will not necessarily understand all of the regulatory compliance requirements for the different job responsibilities. Thus, the HR personnel will be tasked with an area or their expertise identifying the correct job code. The compliance personnel in the organization will have a detailed understanding of the different regulatory compliance license requirements, and can thus be determine if such licenses are required for a given job. By defining different compliance roles in an organization, and mapping these compliance roles to various job codes, the compliance department can efficiently train new compliance employees as to the different compliance roles, and then a compliance employee with a higher level of experience and expertise can manage the mapping of the compliance roles to the different specific regulatory licenses required. Once the job code is mapped to a compliance role the compliance database is updated 1014 to reflect this mapping of job code to the compliance role. Thus, this process provides for storing a plurality of different job codes in the compliance database, and storing a plurality of different compliance roles in the database, and the different job codes area mapped to different compliance roles.

Figure 11:
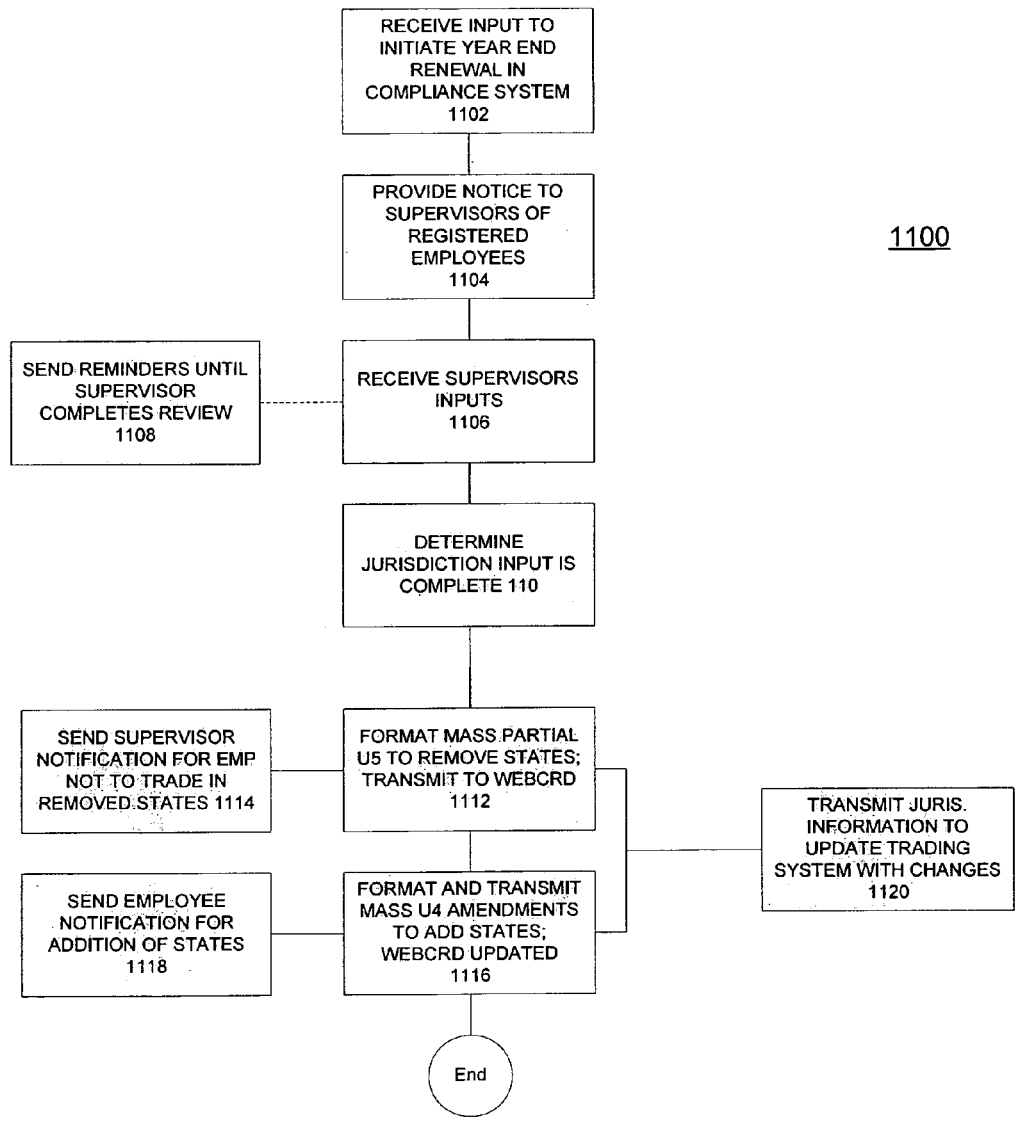
FIG. 11 illustrates a process flow chart of a year-end registration process of an embodiment of the present invention.

FIG. 11 shows a year end registration process 1100 according to an embodiment of the invention herein. Initially the compliance system will receive 1102 an input from a user of the compliance system to initiate the year end renewal process. In one embodiment a user of the compliance system who would initiate the year end registration process would be registration director position. To initiate the year end registration process the user would access the year end process, through a compliance administrator interface page such as 501 of FIG. 5AA, and select on the initiate year end registration icon link. In response to this selection the user would be presented with a year end initiation interface page 561 such as shown in FIG. 5BB. In response to receiving the input to initiate the year end registration process the compliance system would review the compliance database to identify supervisors of licensed employees, and then provide a notification 1104 to the supervisors of the need to input updated license jurisdiction information to the compliance system. The notification could be provided by sending an email to the supervisors, and or by showing the task in the supervisors My task interface page. A supervisor would then access a supervisor year end update registration interface page 563 such as is shown in FIG. 5BC and FIG. 5BD, for each supervised employee and input selections to add or delete states in which the corresponding supervised employee should be registered. The interface page 563 can be provided with an area 573 which shows states where the employee corresponding to the page is registered, and will continue to be registered absent input changes for the supervisor; area 574 provides an area in the interface page where the supervisor can add states for registration, and area 575 provides input fields where a supervisor can identify states where the employees registration should be removed. The supervisor year end update registration interface page 563 can include a supervised employee cost summary area 564 which shows the registration renewal cost associated with the registration for each supervised employee. Thus, this page provides an efficient tool which allows a supervisor to view and manage registration costs, in that the supervisor can add or delete registrations for different states for a supervised employee and see the effect these additions or deletions on the overall registrations costs for employees supervised by the supervisor. The supervisor would be presented with year end registration interface pages for each supervised employee, and would provide inputs for each employee to add or remove states of registration.

The compliance system receives 1106 the supervisors add/remove jurisdictions inputs and save these inputs in the compliance database. Additionally, the compliance system will monitor the inputs for the different supervisors and if a supervisor has not provided the necessary registration renewal information, the compliance system can send 1108 periodic reminders via email to the supervisor regarding the need to provide the registration renewal information.

Upon determination 1110 that the necessary jurisdiction registration has been input to the compliance database, the compliance system will format a partial U5 form which allows for the deletion of specified states for corresponding licensed employees. The formatted partial U5 is then transmitted 1112 to the NASD WebCRD system. Additionally in conjunction with the formatting of the partial U5 form and transmission of the form, the compliance system will provide a notification 1114 to the supervisors, and also potentially the employees themselves, that the employees should not trade or otherwise engage in activities for which they are not licensed in states and which have been deleted from registration for the particular employee. The formatted partial U5 form is referred to as a partial U5 form in that it provides for the removal or deletion of jurisdictions in which an employee is licensed, but this deletion or removal of jurisdiction is not being doing in connection with the termination of an employee. This partial U5 form can also be referred to as a U5 form. Additionally, this formatted partial U5 form can be referred to as a cross organizational, or mass partial U5 form, in that it provides for jurisdiction registration information for multiple employees of the organization.

The compliance system will also format and transmit 1116 a mass U4 amendment which operates to add jurisdiction registrations for employees in accordance with the supervisors' inputs. The compliance system will transmit the mass U4 amendment to the NASD WebCRD system. In conjunction with the formatting and transmission of the mass U4 amendment the compliance system can also provide notification 1118 to supervisors and employees identifying the new jurisdictions in which the employees are licensed. Additionally, based on the new jurisdiction registration information the compliance system transmit 1120 the new jurisdiction information to the organization trading system to update the trading system to allow the employees to trading access only in those jurisdictions where the employee in licensed.

Figure 12:
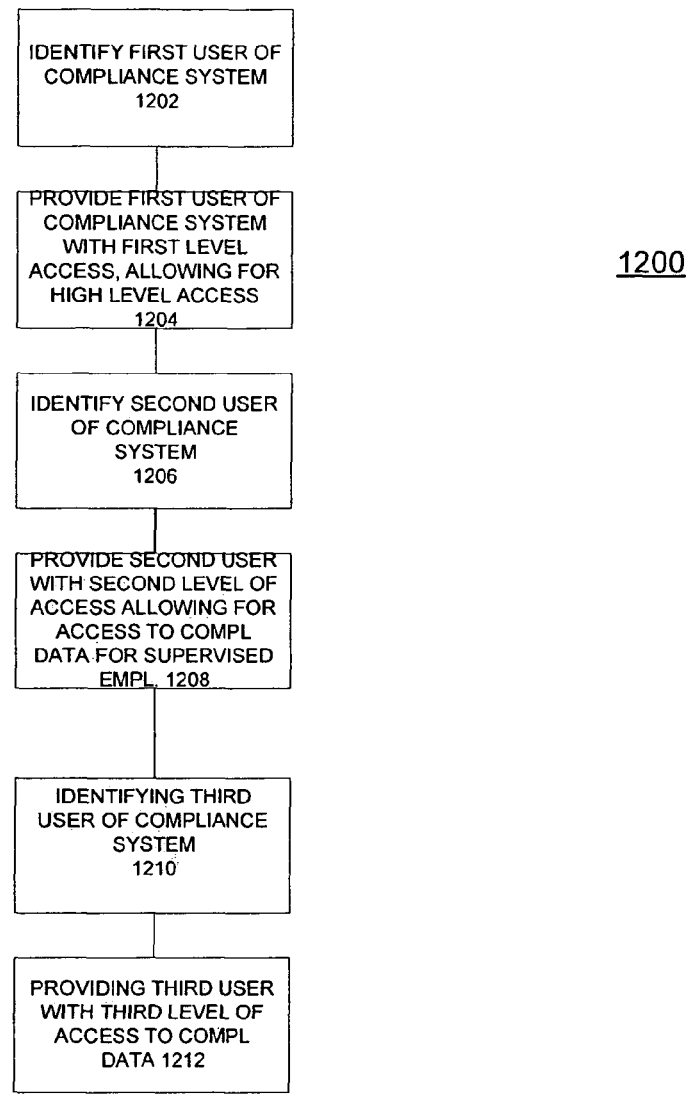
FIG. 12 illustrates a process flow chart of providing different levels of access to a compliance system according to an embodiment of the present invention.

FIG. 12 illustrates an embodiment of a method 1200 of the present invention. At step 1202 a first user of the system is identified. In operation this could correspond to a user of a computer system selecting an address, or a link in a user interface page which corresponds to the address of the compliance system. In one embodiment the user could be prompted to input a user id and password to login to the compliance system, or a single sign-on type system 321 as described above in connection with FIG. 3 could be used, where the single sign-on system provides the user-id and password to the compliance system. The compliance system will use the sign-on information to identify the user. In the example, of FIG. 12 the first user is a high level compliance employee, having a high level of responsibility for ensuring that the organization is complying with regulatory requirements. The compliance system will access information in the compliance database which identifies the different users of the system and provides access clearance data corresponding to each of the users, where this access clearance data defines the level of access for the different users of the compliance system.

Having identified the first user, the compliance system will provide 1204 the first user with a first level of access to the compliance system. This first level of access is a high level of access where the user will be provided with interface pages which among other things allow the first user to search the compliance data stored in the compliance database at an organization level. This means that the first user will be able to conduct searches and generate reports on the different regulatory processes as reflected in the compliance data stored in the compliance database. For example, the first user could be provided with a compliance administrator interface page such as shown in FIG. 5AA, where the compliance administrator page allows the first user to select on a plurality of different compliance processes. The first user can be further provided with different interface pages which all the user to generate searches across different compliances processes. A non-exhaustive list of a organizational level search could include searching all termination processes conducted during a specified time period, or searching all criminal history reviews during a specified time period, or searching for an identification of all U4 amendments seeking to add a particular license for a given time period. These types of searches would be considered organization level in that the searches would not be limited to a specific employee, or specific supervisor level; of course the first user could choose to modify or limit the searches in a number of different way using different combinations of search parameters. As is clear from the discussion provided herein the compliance data stored in the compliance database will include a wide range of compliance information pertaining to the employees of the organization. This information could include an identification of each employee, personal information for each employee, a list of regulatory licenses corresponding to each employee, an identification of different compliance tasks which must be performed by each employee, an identification of an access level to the compliance system for each employee, a job code and a corresponding compliance role for each employee, and additional information as provided for the discussion herein, and a record of actions taken, and status for the various compliance processes.

The compliance system will also operate to identify 1206 a second user of the compliance system, and to provide the second user of the compliance system with a second level of access to the compliance system. For example, in one situation the second user of the compliance system could be a supervisor of customer representatives. The second user would be provided with a more restricted level of access to the compliance system, than the first user, where this more restricted level of access would not allow for organizational level searching. The second level of access in this instance would be a supervisor level of access. This level of access would provide 1208 the second user with interface pages for a supervisor of customer representatives. For example, page 536 of FIG. 5AP shows an interface page which could include an identification of each employee supervised by a particular supervisor, the open regulatory tasks, and the licenses held by each employee.

The compliance system will also operate to identify 1210 a third user of the compliance system, and to provide 1212 the third user with a third level of access to the compliance system. In one example, where the third user is a customer representative employee who does not supervise other employees, the customer representative will be provided with interface pages which allow the third user to review compliance data that pertains to the third user, such as providing the third user with a My profile interface page, or a My Task interface page, or providing access to various form interface pages to allow the third user to update disclosure information, or request new licenses. However, in this type of situation the third level of access will be more limited than the second and first levels of access, in that the third user will not generally be provided with interface pages which allow the user to access compliance data that does not pertain to the third user.

Figure 13:
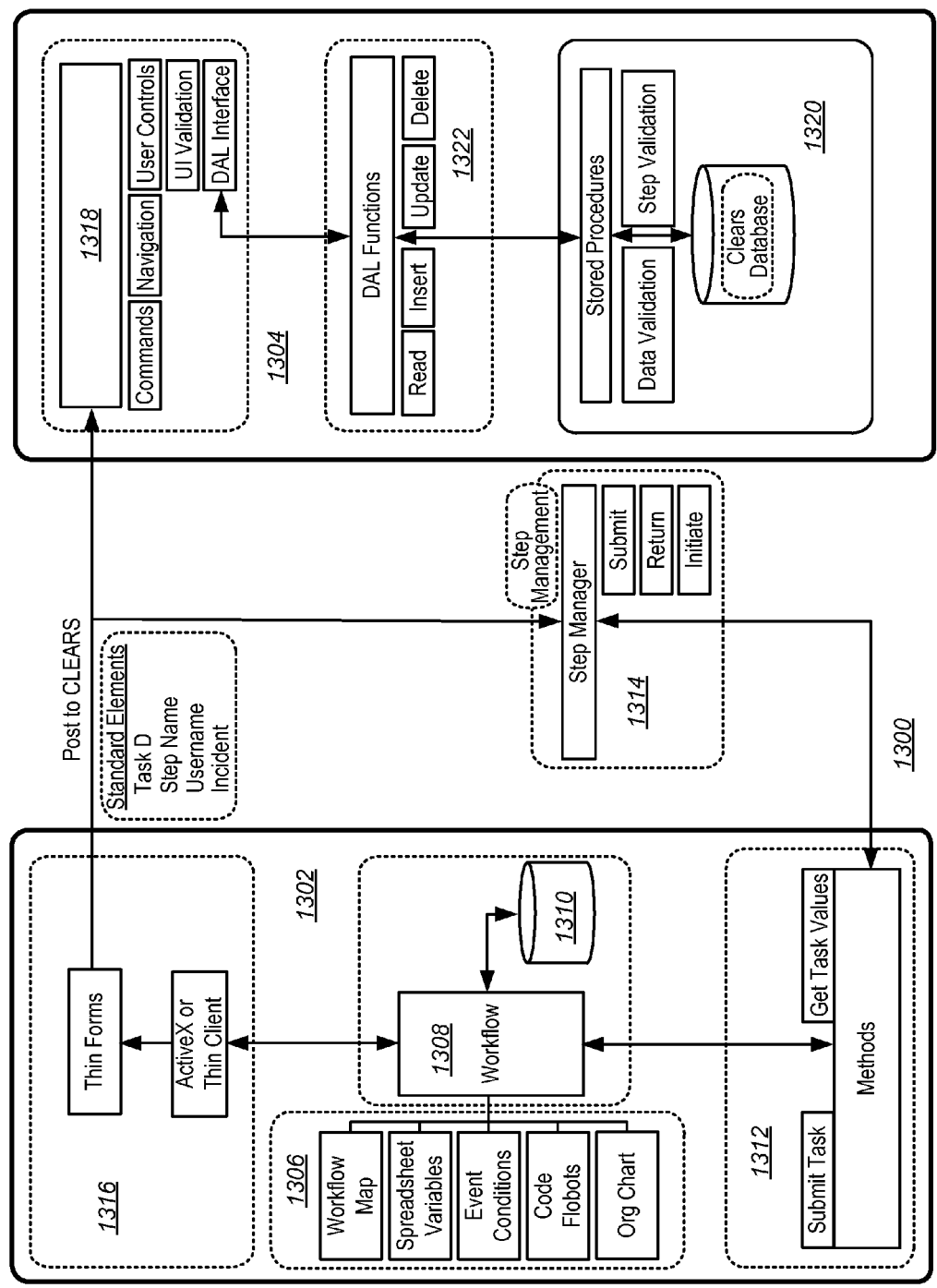
FIG. 13 illustrates an embodiment of a system of the present invention.

FIG. 13 illustrates aspects of one particular embodiment of the system 1300 herein. It should be noted that the discussion provided herein in connection with FIG. 13 describes certain detailed aspects of the operation of one particular system, however, as one of skill in the art will appreciate different technologies and design approaches could also be used also be used. Specifically, FIG. 13 illustrates aspects of the relationship between a business process management application 1302 and a compliance application 1304 in one embodiment. The compliance system 1300 provides for software modules which are executed by one or more processors to provide for automated managing tasks and workflow associated with compliance risk management and investigations. This system can provide a single, audited and validated repository of compliance data and can support features such as: secure access with integration with a single sign-on solution; centralized and audited data repository; web-based interface for task processing, reports and management, and user access; automated task routing and workflow management; automated email notification support; document management; web based reporting via reporting software (such as is available in Brio business reporting software tools, provided by Hyperion Solutions Corporation, of Santa Clara, Calif.).

In one embodiment the business process application 1302 can utilize standard software modules available from different companies which provide business process management software products. In one embodiment the business process management software product from Ultimus (referred to above) is used, and specifically the Ultimus workflow prduct Ver. 6.0 SP1 is used. Different software components from the Ultimus BPM software suite can be used. In one embodiment a BPM studio module 1306 of different submodules are used, these submodules can include: a workflow map, spreadsheet variables component, an event conditions submodule; a code flobots module; and an organization chart submodule. These submodules process events and data and communicate with a workflow service module 1308 which tracks work flow events and manages and stores such events in a workflow database 1310. This workflow database information could also be stored in the compliance database. A workflow integration module 1312 operates to receive and provide information between a step management module 1314, and the workflow service module 1308. The BPM application 1302 also includes a client interface module 1316 which operates to generate forms which are used to provide information and context data to the compliance application 1304.

The compliance application 1304 is designed to manage a broad range of different compliance processes, from investigative operations by subordinate personnel, to risk evaluations performed by senior level management. The compliance systems user interface delivers highly individualized groupings of data and workflow commands, via interface pages, based on the user's role and the workflow process step. The user role and workflow step together are known as Context. Context is the fundamental parameter for determining what a user sees in the interface pages.

The system 1300 shows elements of a user interface (UI) generation module 1318 of the compliance application 1304. In one embodiment the interface pages are implemented using Microsoft ASP.NET technology. In one embodiment user interface components can be implemented as .NET User Controls. Each User control is responsible for presenting and managing related collections of data elements and workflow commands. The compliance system loads and services sets of user controls dynamically, as indicated by the context.

The UI module 1318 provides an additional navigational framework based on a Tab paradigm. Each tab can include some number of Sub Links with which to further filter content view. Together, the combination of user context, tab and sub link create a unique index for delivering and processing content.

The compliance system can provide flexibility for supporting modifications in workflow or content by externalizing the definitions for grouping user controls into a relational database. Workflow steps are added, modified or removed by changing configuration information found in UI module database tables. Tabs and sub links are serviced in the same fashion.

In one embodiment the compliance application 1304 can be accessed either as a standalone application or from the BPM application 1302. When accessed from the BPM 1302 additional commands may appear above the navigation bar in an interface page to allow fast access to commonly used functions.

A number of features can be included to enhance the usability of the compliance system, including the ability to validate and save compliance data in the compliance database 1320 through a data access layer 1322, when navigational or workflow commands are executed. In one embodiment to achieve this, the compliance system utilizes a number of .NET features to implement the application architecture. These features can include: View state; Interfaces (User Control contract for common methods and properties); ASP.NET event model specific processing; ASP.NET validation; Server Controls; Exception handling; and, Session handling.

The View State is used to manage information required to dynamically build content and store global scope elements. Interfaces are used to allow access to individual User Control methods from parent and peer controls as needed. The .NET Event Model is utilized to segregate functionality specific to servicing user input, database interaction and constructing new dynamic content to display. Server controls, use of the Session, validation and exception handling are related to create a robust error handling mechanism.

In one embodiment the compliance system has a single point of entry module "ClearsMain.aspx", which is organized along the ASP.NET web application event model. Once entered Clears Main operates a "loop", loading content and processing program events until the window is closed. In one embodiment the compliance system is primarily focused around the "On Load" and "Pre-Render" events. In one embodiment Clears Main has no intrinsic event processing handlers.

When the program processes the "On Load" event, it loads its runtime environment using either a Runtime Load Class (RuntimeLoad.cs) or a Redirect Class (RedirectManager.cs). The source of the runtime parameters depends on whether or not the entry has been achieved by a "Post Back" or not. The Redirect Manger is only used when the application redirects back to itself. This redirection is the result of certain actions and is used to prevent program anomalies associated with the "Refresh" button on the browser. Runtime parameters can be found in the view state, form or URL.

In one embodiment, a number of elements are common to all controls that comprise compliance system. This includes information about the operator/user, the step in the workflow and the keys that identify the specific incident and subject being processed. Global scope elements are stored in a hash table known as the Global Elements Bag (GEB).

The location for the GEB is administered in point of entry during the on load event. The Header user control has been co-opted to provide memory resources for the global elements since it is accessible to all user controls through the Page hierarchy. The GEB is loaded into the view state in order to maintain a coherent state for the user as screens are posted back for processing. Methods for administering and accessing global scope elements can be provided for in a Session Management Class (SessionManagement.cs).

The compliance system checks the credentials of the user through the Security Class (Security.cs). The security business logic can be implemented in the compliance database and accessed via a stored procedure call. If the user has entered from the workflow manager rights to the workflow step are validated by the web application. The Security Manager returns the context identifier and in some cases tab and sub link values. The Screen Manager uses the information returned from the stored procedure to construct the appropriate content. Subsequent post backs do not check security.

In general the interface page screen layouts can include a number different components including: a Header—The header displays information about the current user; a Workflow Command Bar—The workflow bar provides access to useful functions designed to support the operator; a Navigation Bar—The navigation bar provides additional filters for organizing content; a User Control Collection—An ASP-.NET placeholder control for loading user controls. The header, workflow commands and navigation bar can all be implemented as user controls and are found on every screen. The user control collection is an ASP.NET placeholder control. It is loaded dynamically based on the context.

In operation a screen manager queries a UI database for the collection of user controls to display. The selection criteria is based on the Context, Active Tab and Selected Sub Link. Each user control associated with the screen is loaded into the user control collection place holder. The user controls have a context setting grants or revokes write authority. The list of user controls and their context settings are stored into hash tables and loaded in the view state. The hash tables are utilized for post back operations to reduce processing overhead and maintain coherent application state.

Construction of the navigation interface is part of the screen construction and is handled in the Build Tabs user control (UCBuidTabs.ascx). The control employs several hidden fields for storing index information. Tabs are manufactured in the code behind file as anchors. Each anchor calls a client-side, java script function called "NavClick" with a set of appropriate tab properties. The function then posts back to Clears Main.

Clears Main will validate and save changes to all the user controls found in the user control collection place holder. If an error is found the user is given an opportunity to ignore the error an proceed with the navigation command or they can stop the navigation event and correct the error. In order to manage this Process the following navigational related elements can be stored in the global elements bag: Active Tab—The value of the currently selected tab; Selected Link—The value of the currently selected sub link; Context ID—The context identifier; and Attempted Active Tab—The value of the tab the user would like to proceed to; Attempted Sub Link—The value of the sub link the user would like to proceed to; Old Active Tab—The value of the tab the user has come from; Old Selected Link—The value of the sub link the user has come from; Old Context ID—The last context the user was using.

The compliance application displays error and informational messages through a Server Control (e.g. PopUp.cs) and separate web form called Error.aspx. Error and information data is stored in the Session by Clears Main (or any individual user control therein) and retrieved by Error.aspx for display.

The compliance application provides a document management function and an email notification function. These features can be accessed from the user control collection or are accessible from individual user controls as anchors connected to pop up windows. All popup window services are provided by a separate web form called OpenUserWindow.aspx.

The Open User Window form is responsible for processing the runtime environment parameters from a query string and then loading the appropriate user control.

Each user control follows a standard architecture. A separate presentation component provides the layout of the display. Event processing and other server side logic resides in a code behind file. The interface to the data is externalized into a component class. Any additional business logic is implemented in the database.

The user controls display a form area for accessing record specific data. Some controls also provide a Data Grid for displaying multiple records when there is a one to many relationship. Controls that handle one to many relationships display a list of records in the grid. An "Add New" button is found in the control header and an item command button is included in the grid. When either of these controls are invoked the data entry form is displayed with the appropriate values loaded into the individual data elements.

Each user control can support one or more Interfaces design to allow access into the control from Clears Main or other peer controls. In one embodiment there are 2 main interfaces, one is referred to as Clears User Control (see IClearsUserControl.cs) and one is Clears Validator (see IClearsValidator.cs). The Clears User Control interface provides the following contract items: DoSave—This the method used to validate and save each individual user control. It is called when a navigation event or a workflow interface event is processed. ContextSetting—This property is used to set the user controls context setting when it is loaded into the user control collection place holder. The user controls use this to set data element properties accordingly. IsOpen—This property is used to determine whether the user control should be processed. HasChanged—This property indicates whether the user control has changed since being loaded. This property requires a hidden field to be present in the UI Presentation Code (ASCX File).

The Clears Validator interface provides a single contract called Priority. This is used to determine what order validation occurs. The contract is used by a set of Server Controls that are derived from the Microsoft validation control classes.

The compliance application implements a set of Server Controls derived from the Microsoft Validation class. All of these implement the Clears Validator interface to allow for validation prioritization.

A Pop Up server control is used to provide convenient message display for errors and information messages. It is used by all user controls. Finally a compliance system control panel can be used which provides a mechanism for implementing an interface for understanding if a user control form panel is visible or not.

The Compliance application 1304 can be accessed from the BPM Client interface to perform work associated with work flow tasks. When invoked from the BPM client the compliance application, sometimes referred to herein as Clears, provides additional features and functionality. Clears supports the following BPM related functions: Initiate Incident—Used to begin a new background or criminal investigation; Submit Task for Completion—Used to indicate that a task is complete and to send it to the next step in the process; Return Task—Used to return a task to the originator for additional processing; and Initiate New Task—Used when sending Email notification to track work associated with the correspondence. For all of these features, except Initiate New task, the work flow parameters are loaded by Clears Main using a Load Workflow Parameters function (e.g. RuntimeLoad.cs). The following information is loaded and stored in the global elements bag: Ultimus Task ID—The workflow task; Ultimus Process Name—The workflow process; Ultimus Incident Number—The BPM process identifier; Ultimus Step ID—The workflow step; Ultimus User Name—The name of the user as known to the workflow manager; Incident ID—The Clears incident identifier; Subject ID—The Clears subject identifier. In the listing above the reference to "Ulitmus" could be replaced with a more generic reference to a general business process management tool identifier.

In the case of Initiate Incident the Incident ID and Subject ID are set by Clears and returned to the work flow application. Once complete the work flow process identifier is saved in the Clears database so that the requests can be correlated in future steps. This all occurs in the Initiate Incident DAL (e.g. InitiateIncidentDAL.cs).

Access to workflow commands can be gained through different controls. The functionality for processing these controls can be found in UICommon.cs. The interface to the database for workflow events are found in ClearsDAL.cs.

To prevent anomalies associated with using the browser "Refresh" button, Clears will sometimes redirect to itself in order to clear the client browser buffer. When redirection is required the entire global elements bag is written to the database and the program redirects to itself including the primary key needed to retrieve the global elements bag from the database.

In one embodiment, Clears checks to see if it has been redirected from itself, loads the global elements bag from the database and then deletes the row. If the user uses the refresh button after a redirect a fatal error is returned and the Clears window is closed.

Clears supports e-mail based notifications and requests through the user interface (e.g. ReviewNotification.cs). The Notification manager can also be accessed in a standalone window via "OpenUserWindow.aspx. A set of templates provide are supplied from which the user can select common verbiage. The user can modify the templates as needed to personalize the message. The notification system utilizes XML and XSL.

A plurality of .XSL files can be used in the process of sending out emails. A Stream of XML is passed through an XSL Transform object that is loaded with the appropriate template and a stream of HTML is returned. The XSL files are part of the Clears Web Application, but are also used by several of the stand alone applications.

The notification manager allows users to attach documents. In order to process attachments the document must be uploaded to the server. There is a system parameters governing the size of files that can be attached. The attached file is uploaded to the server and written to a temporary file that is then deleted.

In one embodiment a document manager can be accessed in a standalone window via "OpenUserWindow.aspx as well as from Clears. The document management user control takes advantage of the "file" input tag type. This provides a convenient interface to browse the file system.

In one embodiment an AutoAlert.exe is an executable called by a Scheduled Task on the machine that hosts the Clears Web Application. This exe is responsible for monitoring the ClearsAlert table for any Alerts that need to be sent. AutoAlert.exe process all rows in the ClearsAlert table where the field AlertSentFlag is not equal to one. AutoAlert is dependent on the following .dlls: ClearsFramework.dll; Microsoft.ApplicationBlocks.ExceptionManagement.dll; Microsoft.ApplicationBlocks.ExceptionManagement.Interfaces.dll; and System.Web.dll. These dll's along with AutoAlert.exe can reside together in the same directory.

An ASP.Net HTML editor for IE internet explorer can be used to edit the content of notifications provided to users; one such type of editor is Free Text Box. This tool can be used by administrators of the system in the Notifications user control to give users the ability to edit HTML text to be sent as e-mail notifications to different users of the system. The administrator user has the ability to freely enter text and format it in any fashion that he/she chooses or select from a list of available templates to populate the editor with pre-approved messages for a particular situation.

In conjunction with the operations described above a report generation application can also be incorporated to the system and method. In one embodiment a software reporting module Brio, provided by Hyperion Solutions Corporation, of Santa Clara, Calif. is utilized. The reporting module uses compliance database Views to produce the requested dataset for the reports.

Figure 7:
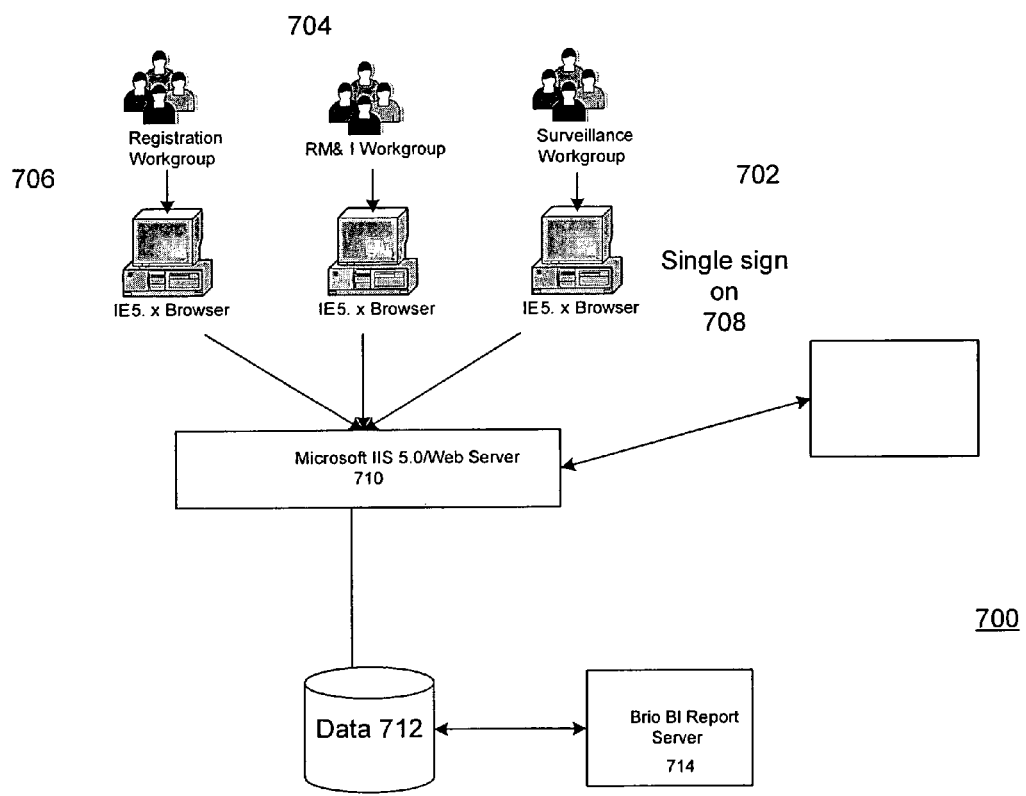
FIG. 7 illustrates an embodiment of a system of the present invention.

FIG. 7 shows aspects of an embodiment of a system 700 of the invention. The system provides for a plurality of different client user computers 702, 704, 706, which can be used by different groups employees of the organization, such as surveillance workgroups, risk management and investigation employees, and registration compliance groups. Additionally, the users could be customer representatives located at remote locations. In one embodiment the client user computers would be personal computers using the Microsoft XP operating system, and interne explorer 6.0 or higher, with an incorporated intranet web application, and software plugin for interfacing with the reporting module software, such as a Brio plug-in.

The client computers are then in communication with a server computer 710. In one embodiment the communications use HTTP, but other communication protocols could also be used. In one embodiment the server computer uses a standard Microsoft Web Server configuration, including: MS Internet Information Services (IIS) 5.0; NetPoint ISAPI Filter; MS ASP.NET can be used to develop the web components; MS Windows 2000 OS; and Brio for reporting. In one embodiment the server 710 could also be running the BPM application and the compliance application, or these applications could be running on another computer system coupled with the server 710.

The web server 710 operates to store and retrieve data from the compliance data base 712. The database used to implement the compliance database 712 can be embodied in a Standard Microsoft SQL Server configuration, which could include: MS SQL Server 2000/SP3; MS Windows 2000 OS; and Disclosures Database.

The connection of users to the database is provided through the Webserver 710, and security can be provided for using the Single sign-on system 708, where aspects of a single sign on system are discussed above.

In one embodiment a separate reporting module server, or Brio web server 708, is provided. The report server 708 operates to generate report using data retrieved from the database 712. The report server 708 environment can be configured to connect to the SQL server environment of database 712.

Although only specific embodiments of the present invention are shown and described herein, the invention is not to be limited by these embodiments. Rather, the scope of the invention is to be defined by these descriptions taken together with the attached claims and their equivalents.

What is claimed is:

1. A computer implemented method for managing regulatory compliance in an organization, the method including:
   storing a plurality of different job codes in a compliance database;
   storing a plurality of different compliance roles in the compliance database, and for each compliance role identifying a corresponding set of required licenses;
   for a new employee receiving data indicating a job code for the new employee, and receiving data identifying regulatory licenses held by the new employee;
   identifying a first compliance role selected from the plurality of compliance roles which corresponds to the job code, wherein the first compliance role has a first set of required licenses;
   determining if the new employee has all of the first set of required licenses;
   if it is determined that the new employee does not have all of the first set of required licenses, notifying the new employee that the new employee must obtain one or more regulatory licenses.

2. The method of claim 1 further including:
   presenting a job code interface page to a first user, wherein the job code interface page includes a first data field identifying a selected job code, and a second data field where the first user can populate the second data field with a selected compliance role, wherein the selected compliance role is one of the plurality of different compliance roles, which corresponds to the selected job code; and
   wherein after the selected compliance role has been entered into the second field, saving a mapping of the selected job code to the selected compliance role in the compliance database.

3. A computer implemented method for managing regulatory compliance in an organization, the method comprising:
   presenting a first interface page to a first supervisor of employees having regulatory licenses, wherein the first interface page corresponds to a first employee supervised by the first supervisor;
   including in the first interface page a first area for adding state license registrations for the first employee, and a second area for removing state license registrations for the first employee;

receiving a first input from the first supervisor which identifies states in which the first employee should be registered;

presenting a second interface page to the first supervisor, wherein the second interface page corresponds to a second employee supervised by the first supervisor;

including in the second interface page a first area for adding state license registrations for the second employee, and a second area for removing state license registrations for the second employee;

receiving a second input from the first supervisor which identifies states in which the second employee should be registered;

preparing a mass partial form which identifies states in which the first employee should be registered, and which identifies states in which the second employee should be registered, the mass partial form allowing the first employee and the second employee state license registrations to be updated with a single transaction; and transmitting the mass partial form to a NASD WebCRD system.

4. The method of claim 3 further comprising:

preparing a second form which identifies states one or more state license registrations for the first employee should be terminated, and identifies one or more state license registrations for the second employee which should be terminated; and transmitting the second form to the NASD WebCRD system.

5. The method of claim 3 further comprising:

updating a trading system to indicate changes in the state registrations for the first employee and the second employee.

6. The method of claim 3 further comprising sending a notice to the first employee notifying the first employee of the states in which the first employee is registered.

7. The method of claim 3 further comprising:

receiving an initiate year end registration input;

in response to a receiving the initiate year end registration input, providing notice to the first supervisor which indicates to the first supervisor that first supervisor must provide an update of the state registration information for all employees supervised by the first supervisor.

8. The method of claim 7 further comprising:

if the update has not been received from the first supervisor within a predetermined amount of time after the providing notice to the supervisor, providing a reminder to the first supervisor that the first supervisor must provide the update.

9. The method of claim 3 further comprising:

including in the first interface page a third area which identifies a plurality of licensed employees supervised by the first supervisor, and for each of the plurality of licensed employees provides a total registration cost corresponding to each employee.

\* \* \* \* \*